US012634841B2

(12) United States Patent
Liu

(10) Patent No.: US 12,634,841 B2
(45) Date of Patent: May 19, 2026

(54) METHOD AND DEVICE IN NODES USED FOR WIRELESS COMMUNICATION

(71) Applicant: Zheng Liu, Shanghai (CN)

(72) Inventor: Zheng Liu, Shanghai (CN)

(73) Assignee: SHANGHAI TUILUO COMMUNICATION TECHNOLOGY PARTNERSHIP (LIMITED PARTNERSHIP), Shanghai (CN)

( * ) Notice: Subject to any disclaimer, the term of this patent is extended or adjusted under 35 U.S.C. 154(b) by 314 days.

(21) Appl. No.: 18/412,637

(22) Filed: Jan. 15, 2024

(65) Prior Publication Data

US 2024/0155515 A1     May 9, 2024

Related U.S. Application Data

(63) Continuation of application No. PCT/CN2022/106950, filed on Jul. 21, 2022.

(30) Foreign Application Priority Data

Jul. 22, 2021     (CN) .......................... 202110828886.9

(51) Int. Cl.
*H04W 72/02*          (2009.01)
*H04W 52/36*          (2009.01)
(Continued)

(52) U.S. Cl.
CPC ......... *H04W 52/367* (2013.01); *H04W 72/02* (2013.01); *H04W 72/0446* (2013.01); *H04W 72/0453* (2013.01)

(58) Field of Classification Search
CPC ........................... H04W 52/367; H04W 72/02
(Continued)

(56) References Cited

U.S. PATENT DOCUMENTS

| | | | |
|---|---|---|---|
| 10,506,523 | B2 | 12/2019 | Zhang et al. |
| 2020/0374807 | A1 * | 11/2020 | Zhang ................... H04L 5/0091 |
| 2021/0204251 | A1 | 7/2021 | Laghate et al. |

FOREIGN PATENT DOCUMENTS

| | | | |
|---|---|---|---|
| CN | 102780670 A | * | 11/2012 |
| CN | 103535086 A | | 1/2014 |

(Continued)

OTHER PUBLICATIONS

Supplementary European Search Report received in application EP22845381.7 dated Sep. 16, 2024.
(Continued)

*Primary Examiner* — Sibte H Bukhari

(57)          ABSTRACT

A node receives a first information block comprising configuration information of a target sub-band and a first signaling determining a target time-frequency resource set; and transmits a target signal with a target Tx power; the target Tx power is equal to a smaller value between a first Tx power and a target power upper limit, and the target time-frequency resource set determines a first parameter value which the first Tx power is linear with; a power class of the node determines a second parameter value, the second parameter value determining a value range of the target power upper limit; a relation between the target time-frequency resource set and the target sub-band or the configuration information is used to determine at least one of the value range of the target power upper limit or the first Tx power. Link performance is ensured.

20 Claims, 5 Drawing Sheets

100 receiving first information block and receiving first signaling — 101 transmitting target signal with target Tx power in target time-frequency resource set — 102

(51) Int. Cl.
*H04W 72/0446* (2023.01)
*H04W 72/0453* (2023.01)

(58) Field of Classification Search
USPC ......................................................... 370/318
See application file for complete search history.

(56) References Cited

FOREIGN PATENT DOCUMENTS

| | | | | |
|---|---|---|---|---|
| CN | 106961721 | A | 7/2017 | |
| CN | 107708155 | A | 2/2018 | |
| CN | 108738120 | A | 11/2018 | |
| CN | 111586820 | A | 8/2020 | |
| CN | 111901872 | A  * | 11/2020 | ............ H04W 72/56 |
| WO | 2017222207 | A1 | 12/2017 | |

OTHER PUBLICATIONS

ISR received in application No. PCT/CN2022/106950 dated Oct. 20, 2022.

\* cited by examiner

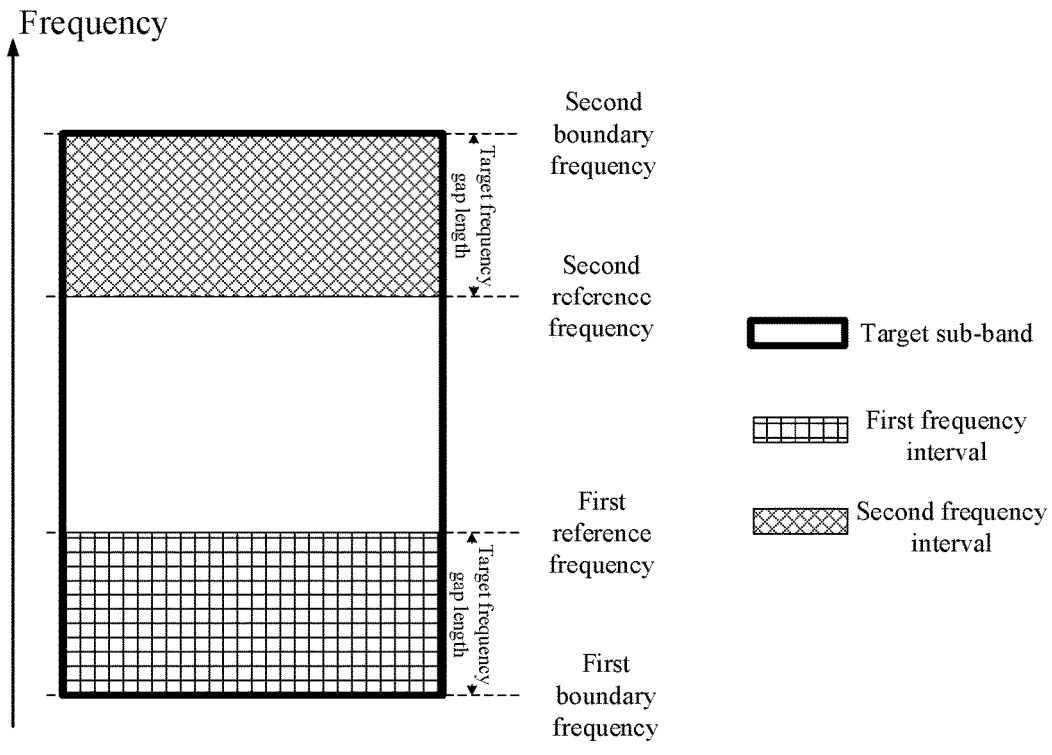
FIG. 8
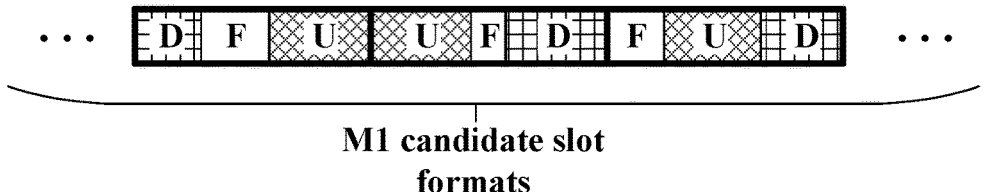
FIG. 9
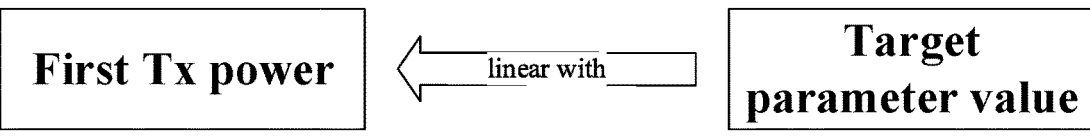
FIG. 10
FIG. 11

METHOD AND DEVICE IN NODES USED FOR WIRELESS COMMUNICATION

CROSS REFERENCE TO RELATED APPLICATIONS

This application is the continuation of the international patent application No. PCT/CN2022/106950, filed on Jul. 21, 2022, and claims the priority benefit of Chinese Patent Application No. 202110828886.9, filed on Jul. 22, 2021, the full disclosure of which is incorporated herein by reference.

BACKGROUND

Technical Field

The present application relates to transmission methods and devices in wireless communication systems, and in particular to a transmission scheme and device for flexible transmission direction configurations in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR. It was decided at the 3GPP RAN #86 Plenary that the Study Item (SI) and the Work Item (WI) of NR Rel-17 should be started, and the SI and WI of NR Rel-18 are expected to be proposed at the 3GPP RAN #94e plenary.

Enhanced Mobile BroadBand (eMBB), Ultra-reliable and Low Latency Communications (URLLC) and massive Machine Type Communications (mMTC) are three major application scenarios in New Radio (NR) technology.

SUMMARY

In the existing NR system, spectrum resources are statically divided into FDD spectrum and TDD spectrum. As for TDD spectrum, both the base station and the UE work in Half Duplex Mode. Such Half Duplex Mode avoids self-interference and reduces the influence of Cross Link interference, but it also brings about a reduction of resource utilization ratio and a longer delay. In view of these problems, to support flexible duplex mode or variable link directions (Uplink, or Downlink, or Flexible ones) on the TDD spectrum or the FDD spectrum becomes a potential solution.

To address the issue of configuration of link directions in cases supporting Flexible Duplex Mode, the present application provides a solution. It should be noted that the description in the present application only takes Flexible Duplex Mode as a typical application scenario or example; this application is also applicable to other scenarios confronting similar issues, for instance, scenarios where a link direction changes, or scenarios supporting multi-stage configuration of transmission directions, or those equipped with a more powerful base station or UE, such as a base station or UE that supports intra-frequency full duplex scenarios or is targeted for various application scenarios like eMBB and URLLC, where similar technical effects can be achieved. Additionally, the adoption of a unified solution for various scenarios, including but not limited to eMBB and URLLC scenarios, contributes to the reduction of hardcore complexity and costs. In the case of no conflict, the embodiments of a first node and the characteristics in the embodiments may be applied to a second node, and vice versa. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:

receiving a first information block and receiving a first signaling, the first information block comprising configuration information of a target sub-band, the configuration information of the target sub-band being used to at least determine a slot format for the target sub-band, and the first signaling being used to determine a target time-frequency resource set, the target time-frequency resource set comprising at least one resource block in frequency domain and at least one time-domain symbol in time domain; and transmitting a target signal with a target transmit (Tx) power in the target time-frequency resource set;

herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

In one embodiment, a first Tx power is determined according to a target parameter value, and adjusting a transmit power according to whether a sub-band (or BWP) to which an uplink signal or channel belongs in frequency domain supports Flexible Duplex or Variable Link can be supported, so that the influence of the received SINR caused by Flexible Duplex is taken into full account, which enhances the link performance of uplink transmission.

In one embodiment, a value range of a target power upper limit is determined according to a target parameter value, and $P_{CMAX}$ adjustment is supported according to whether a sub-band (or BWP) to which an uplink signal or channel belongs in frequency domain supports Flexible Duplex or Variable Link, which considers various influences (such as adjacent channel interference or leakage and Non-linear PA) of the radio frequency (RF) end caused by Flexible Duplex, thus reducing both adjacent channel interference and cross link interference while ensuring the link performance of uplink transmission.

According to one aspect of the present application, the above method is characterized in comprising:

receiving a second information block;

herein, the second information block is used to determine a first time-domain symbol set corresponding to downlink and a second time-domain symbol set corresponding to uplink; whether the target time-frequency resource set comprises at least one time-domain symbol belonging to the first time-domain symbol set in time domain is used to determine the target parameter value out of the C1 candidate parameter values, or, whether any time-domain symbol comprised by the target time-frequency resource set in time domain belongs to the second time-domain symbol set is used to determine the target parameter value out of the C1 candidate parameter values.

In one embodiment, when determining parameters of power control or $P_{CMAX}$ the relations between occupied time-domain resources and configured UL and DL symbols are taken into account, so that the transmit power or $P_{CMAX}$ can be adjusted according to the interferences that different time-domain positions are subjected to or different SINR environments, which further optimizes the link performance and system performance.

According to one aspect of the present application, the above method is characterized in comprising:

receiving a third information block;

herein, the third information block is used to determine a reference power upper-bound value; a first boundary value is equal to an upper boundary value of the value range of the target power upper limit, and a second boundary value is equal to a lower boundary value of the value range of the target power upper limit; the second parameter value and the reference power upper-bound value are used together to determine the first boundary value; the second boundary value is equal to a smaller value between a difference of the reference power upper-bound value and the target parameter value and a difference of the second parameter value and a power backoff value, or the second boundary value is equal to a smaller value between a difference of the reference power upper-bound value and a first offset value and a difference of the second parameter value and the power backoff value; the target parameter value is used to determine the power backoff value, and a position of resource blocks comprised by the target time-frequency resource set in frequency domain in a band to which the target time-frequency resource set belongs is used to determine the first offset value.

In one embodiment, the influences of Flexible Duplex or Variable Link are implicitly considered in $T_{C,c}$ or MPR of one kind (such as MPR, A-MPR or P-MPR), which makes it possible to take into account the RF influence of Flexible Duplex in $P_{CMAX}$ and at the same time reduce the complexity and standard impact.

According to one aspect of the present application, the above method is characterized in that a first boundary frequency is equal to a lowest boundary frequency of the target sub-band, while a second boundary frequency is equal to a highest boundary frequency of the target sub-band; a first reference frequency is equal to a sum of the first boundary frequency and a target frequency gap length, while a second reference frequency is equal to a difference between the second boundary frequency and the target frequency gap length; a first frequency interval is a frequency interval ranging from the first boundary frequency to the first reference frequency, while a second frequency interval is a frequency interval ranging from the second reference frequency to the second boundary frequency; a locational relation between the target time-frequency resource set and the first frequency interval or the second frequency interval in frequency domain is used to determine the target parameter value out of the C1 candidate parameter values.

According to one aspect of the present application, the above method is characterized in that the configuration information of the target sub-band comprises at least one of location information of the target sub-band in frequency domain or a link direction indicator of the target sub-band; the link direction indicator of the target sub-band is used to determine the slot format for the target sub-band.

According to one aspect of the present application, the above method is characterized in that any slot format for the target sub-band is one of M1 candidate slot formats, M1 being a positive integer greater than 1; among the M1 candidate slot formats there exists at least one candidate slot format in which an uplink time-domain symbol is earlier than a downlink time-domain symbol.

In one embodiment, a slot format in which uplink time-domain symbols are earlier than downlink time-domain symbols is supported in enabling a more flexible configuration of link directions, which maximizes the degree of freedom in Flexible Duplex, and further enhances the resource utilization ratio and the system performance.

According to one aspect of the present application, the above method is characterized in that the first Tx power is measured in dBm, and the first Tx power is linear with the target parameter value, and the number of resource block(s) comprised by the target time-frequency resource set in frequency domain is used to determine the target parameter value out of the C1 candidate parameter values.

In one embodiment, the adjustment of a calculated transmit power in accordance with the bandwidth of a transmission gives consideration to all kinds of interference intensities caused on different bandwidths, thus maximizing the transmission performance while reducing interferences.

The present application provides a method in a second node for wireless communications, comprising:

transmitting a first information block and transmitting a first signaling, the first information block comprising configuration information of a target sub-band, the configuration information of the target sub-band being used to at least configure a slot format for the target sub-band, and the first signaling being used to indicate a target time-frequency resource set, the target time-frequency resource set comprising at least one resource block in frequency domain and at least one time-domain symbol in time domain; and receiving a target signal in the target time-frequency resource set, with a target transmit (Tx) power being equal to a transmit (Tx) power of the target signal;

herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

According to one aspect of the present application, the above method is characterized in comprising:

transmitting a second information block;

herein, the second information block is used to indicate a first time-domain symbol set corresponding to downlink and a second time-domain symbol set corresponding to uplink; whether the target time-frequency resource set comprises at least one time-domain symbol belonging to the first time-domain symbol set in time domain is used to determine the target parameter value out of the C1 candidate parameter values, or, whether any time-domain symbol comprised by the target time-frequency resource set in time domain belongs to the second time-domain symbol set is used to determine the target parameter value out of the C1 candidate parameter values.

According to one aspect of the present application, the above method is characterized in comprising:

transmitting a third information block;

herein, the third information block is used to indicate a reference power upper-bound value; a first boundary value is equal to an upper boundary value of the value range of the target power upper limit, and a second boundary value is equal to a lower boundary value of the value range of the target power upper limit; the second parameter value and the reference power upper-bound value are used together to determine the first boundary value; the second boundary value is equal to a smaller value between a difference of the reference power upper-bound value and the target parameter value and a difference of the second parameter value and a power backoff value, or the second boundary value is equal to a smaller value between a difference of the reference power upper-bound value and a first offset value and a difference of the second parameter value and the power backoff value; the target parameter value is used to determine the power backoff value, and a position of resource blocks comprised by the target time-frequency resource set in frequency domain in a band to which the target time-frequency resource set belongs is used to determine the first offset value.

According to one aspect of the present application, the above method is characterized in that a first boundary frequency is equal to a lowest boundary frequency of the target sub-band, while a second boundary frequency is equal to a highest boundary frequency of the target sub-band; a first reference frequency is equal to a sum of the first boundary frequency and a target frequency gap length, while a second reference frequency is equal to a difference between the second boundary frequency and the target frequency gap length; a first frequency interval is a frequency interval ranging from the first boundary frequency to the first reference frequency, while a second frequency interval is a frequency interval ranging from the second reference frequency to the second boundary frequency; a locational relation between the target time-frequency resource set and the first frequency interval or the second frequency interval in frequency domain is used to determine the target parameter value out of the C1 candidate parameter values.

According to one aspect of the present application, the above method is characterized in that the configuration information of the target sub-band comprises at least one of location information of the target sub-band in frequency domain or a link direction indicator of the target sub-band; the link direction indicator of the target sub-band is used to determine the slot format for the target sub-band.

According to one aspect of the present application, the above method is characterized in that any slot format for the target sub-band is one of M1 candidate slot formats, M1 being a positive integer greater than 1; among the M1 candidate slot formats there exists at least one candidate slot format in which an uplink time-domain symbol is earlier than a downlink time-domain symbol.

According to one aspect of the present application, the above method is characterized in that the first Tx power is measured in dBm, and the first Tx power is linear with the target parameter value, and the number of resource block(s) comprised by the target time-frequency resource set in frequency domain is used to determine the target parameter value out of the C1 candidate parameter values.

The present application provides a first node for wireless communications, comprising:

a first receiver, which receives a first information block and receives a first signaling, the first information block comprising configuration information of a target sub-band, the configuration information of the target sub-band being used to at least determine a slot format for the target sub-band, and the first signaling being used to determine a target time-frequency resource set, the target time-frequency resource set comprising at least one resource block in frequency domain and at least one time-domain symbol in time domain; and a first transmitter, which transmits a target signal with a target transmit (Tx) power in the target time-frequency resource set;

herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

The present application provides a second node for wireless communications, comprising:

a second transmitter, which transmits a first information block and transmits a first signaling, the first information block comprising configuration information of a target sub-band, the configuration information of the target sub-band being used to at least configure a slot format for the target sub-band, and the first signaling being used to indicate a target time-frequency resource set, the target time-frequency resource set comprising at least one resource block in frequency domain and at least one time-domain symbol in time domain; and a second receiver, which receives a target signal in the target time-frequency resource set, with a target transmit (Tx) power being equal to a transmit (Tx) power of the target signal;

herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

In one embodiment, the method in the present application has the following advantages:

The method in the present application provides support for adjusting a transmit power according to whether a sub-band (or BWP) to which an uplink signal or channel belongs in frequency domain supports Flexible Duplex or Variable Link, so that the influence of the received SINR caused by Flexible Duplex is taken into full account, which enhances the link performance of uplink transmission;

The method in the present application provides support for adjusting $P_{CMAX}$ according to whether a sub-band (or BWP) to which an uplink signal or channel belongs in frequency domain supports Flexible Duplex or Variable Link, which considers various influences (such as adjacent channel interference or leakage and Nonlinear PA) of the radio frequency (RF) end caused by Flexible Duplex, thus reducing both adjacent channel interference and cross link interference while ensuring the link performance of uplink transmission;

The method in the present application takes into account the relations between occupied time-domain resources and configured UL and DL symbols when determining parameters of power control or $P_{CMAX}$, so that the transmit power or $P_{CMAX}$ can be adjusted according to the interferences that different time-domain positions are subjected to or different SINR environments, which further optimizes the link performance and system performance;

The method in the present application implicitly considers the influences of Flexible Duplex or Variable Link in $T_{C,c}$ or MPR of one kind (such as MPR, A-MPR or P-MPR), which makes it possible to take into account the RF influence of Flexible Duplex in $P_{CMAX}$ and at the same time reduce the complexity and standard impact;

The method in the present application supports a slot format in which uplink time-domain symbols are earlier than downlink time-domain symbols, which enables a more flexible configuration of link directions that maximizes the degree of freedom in Flexible Duplex and further enhances the resource utilization ratio and the system performance;

The method in the present application adjusts a calculated transmit power in accordance with the bandwidth of a transmission, giving consideration to all kinds of interference intensities caused on different bandwidths, thus maximizing the transmission performance while reducing interferences.

BRIEF DESCRIPTION OF THE DRAWINGS

Other features, objects and advantages of the present application will become more apparent from the detailed description of non-restrictive embodiments taken in conjunction with the following drawings:

FIG. 8 illustrates a schematic diagram of a first frequency interval and a second frequency interval according to one embodiment of the present application.

FIG. 9 illustrates a schematic diagram of configuration information of a target sub-band according to one embodiment of the present application.

FIG. 10 illustrates a schematic diagram of M1 candidate slot formats according to one embodiment of the present application.

FIG. 11 illustrates a schematic diagram illustrating a relation between a first Tx power and a target parameter value according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
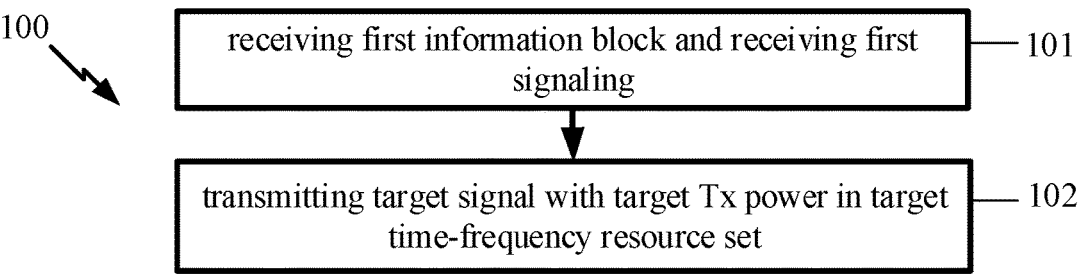
FIG. 1 illustrates a flowchart of a first information block, a first signaling and a target signal according to one embodiment of the present application.

Embodiment 1 illustrates a flowchart 100 of a first information block, a first signaling and a target signal according to one embodiment of the present application, as shown in FIG. 1. In FIG. 1, each step represents a step, it should be particularly noted that the order of boxes herein is just for illustration and does not restrict a chronological order of steps marked respectively by these boxes.

In Embodiment 1, the first node in the present application receives a first information block and receives a first signaling in step 101, the first information block comprising configuration information of a target sub-band, the configuration information of the target sub-band being used to at least determine a slot format for the target sub-band, and the first signaling being used to determine a target time-frequency resource set, the target time-frequency resource set comprising at least one resource block in frequency domain and at least one time-domain symbol in time domain; and the first node in the present application transmits a target signal with a target Tx power in the target time-frequency resource set in step 102; the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

In one embodiment, the first information block comprises higher-layer information or higher-layer parameter configuration.

In one embodiment, the first information block comprises one or more Information Elements (IEs) comprised by a Radio Resource Control (RRC) layer signaling, or the first information block comprises one or more fields comprised by an RRC layer signaling.

In one embodiment, the first information block comprises part of or all fields comprised by a Master Information Block (MIB).

In one embodiment, the first information block comprises part of or all fields comprised by a System Information Block (SIB).

In one embodiment, the first information block is UE specific or UE dedicated.

In one embodiment, the first information block is Cell Common or Cell specific.

In one embodiment, the first information block comprises physical layer control information or physical layer control parameters.

In one embodiment, the first information block comprises part of or all fields in a Downlink Control Information (DCI) Format.

In one embodiment, the first information block is transmitted through a Physical Downlink Control Channel (PDCCH).

In one embodiment, the first information block is specific to or dedicated to the target sub-band.

In one embodiment, the first information block is only used for configuring the target sub-band.

In one embodiment, the first information block is dedicated to a sub-band other than the target sub-band which has a same ID or index as the target sub-band.

In one embodiment, the first information block is used for configuring a sub-band other than the target sub-band which has a same ID or index as the target sub-band.

In one embodiment, a sub-band other than the target sub-band which has a same ID or index as the target sub-band shares all or partial configuration parameters in the first information block with the target sub-band.

In one embodiment, the first information block comprises part of or all fields in an IE "BWP-Flexible".

In one embodiment, the first information block comprises part of or all fields in an IE "BWP-Downlink".

In one embodiment, the first information block comprises part of or all fields in an IE "BWP-Uplink".

In one embodiment, the first information block comprises an IE other than an IE "BWP-Downlink" or an IE "BWP-Uplink".

In one embodiment, the statement of "the first information block comprising configuration information of a target sub-band" in the claims includes the following meaning: the first information block is used to determine configuration information of the target sub-band.

In one embodiment, the statement of "the first information block comprising configuration information of a target sub-band" in the claims includes the following meaning: the first information block carries configuration information of the target sub-band.

In one embodiment, the statement of "the first information block comprising configuration information of a target sub-band" in the claims includes the following meaning: one or more fields comprised by the first information block is/are used to explicitly or implicitly configure the target sub-band.

In one embodiment, the statement of "the first information block comprising configuration information of a target sub-band" in the claims includes the following meaning: the first information block is used to explicitly or implicitly indicate value(s) of one or more configuration parameters of the target sub-band.

In one embodiment, the target sub-band is a Bandwidth Part (BWP).

In one embodiment, the target sub-band is a downlink Bandwidth Part (DL BWP) or an uplink Bandwidth Part (UL BWP).

In one embodiment, the target sub-band is a BWP with Flexible or Variable Link.

In one embodiment, the target sub-band is a sub-band supporting Flexible or Variable Duplex.

In one embodiment, the target sub-band is a BWP supporting Flexible or Variable Duplex.

In one embodiment, the target sub-band is a BWP supporting both Uplink and Downlink.

In one embodiment, the target sub-band is a BWP with a larger bandwidth between an uplink BWP and a downlink BWP corresponding to a same BWP ID.

In one embodiment, the target sub-band is an Initial BWP or a Default BWP.

In one embodiment, the target sub-band comprises at least one BWP.

In one embodiment, the target sub-band consists of multiple BWPs.

In one embodiment, the target sub-band comprises at least one subcarrier.

In one embodiment, the target sub-band comprises at least one PRB.

In one embodiment, all subcarriers comprised by the target sub-band belong to a same BWP.

In one embodiment, a BWP comprises the target sub-band.

In one embodiment, the target sub-band comprises two subcarriers respectively belonging to different BWPs.

In one embodiment, the target sub-band can span across two different BWPs.

In one embodiment, the target sub-band consists of frequency-domain resources comprised by the target time-frequency resource set.

In one embodiment, the target sub-band is contiguous frequency-domain resources occupied by the target time-frequency resource set.

In one embodiment, the target sub-band comprises multiple subcarriers, and any two subcarriers comprised by the target sub-band have equal subcarrier spacings.

In one embodiment, the target sub-band comprises multiple subcarriers, and two subcarriers comprised by the target sub-band have unequal subcarrier spacings.

In one embodiment, the target sub-band comprises contiguous frequency-domain resources.

In one embodiment, the target sub-band comprises discrete frequency-domain resources.

In one embodiment, the target sub-band comprises a Guard subcarrier or a Guard PRB.

In one embodiment, the target sub-band comprises subcarriers or PRBs unavailable for transmission or allocation.

In one embodiment, configuration information of the target sub-band comprises a type of the target sub-band or a type of a sub-band set to which the target sub-band belongs.

In one embodiment, configuration information of the target sub-band comprises a type of a BWP set to which the target sub-band belongs.

In one embodiment, configuration information of the target sub-band comprises a duplex type of the target sub-band or a duplex type of a sub-band set to which the target sub-band belongs.

In one embodiment, configuration information of the target sub-band comprises whether the target sub-band belongs to a sub-band set supporting multiple link directions.

In one embodiment, configuration information of the target sub-band comprises whether the target sub-band belongs to a BWP set supporting multiple link directions.

In one embodiment, configuration information of the target sub-band comprises whether the target sub-band is a sub-band with Flexible or Variable Link or whether the target sub-band belongs to a sub-band set with Flexible Link (FL) or Variable Link (VL).

In one embodiment, configuration information of the target sub-band comprises whether the target sub-band is a sub-band with Flexible or Variable Link or whether the target sub-band belongs to a BWP set with Flexible Link (FL) or Variable Link (VL).

In one embodiment, configuration information of the target sub-band comprises whether there is(are) overlapping subcarrier(s) between the target sub-band and an Initial BWP.

In one embodiment, configuration information of the target sub-band comprises whether there is(are) overlapping subcarrier(s) between the target sub-band and a Default BWP.

In one embodiment, configuration information of the target sub-band comprises whether the target sub-band supports a link direction of time-domain symbols configured as an uplink or a downlink by an IE "tdd-UL-DL-ConfigCommon" in being overridden.

In one embodiment, configuration information of the target sub-band comprises whether the target sub-band supports a link direction of time-domain symbols configured as an uplink or a downlink by an IE "tdd-UL-DL-ConfigDedicated" in being overridden.

In one embodiment, configuration information of the target sub-band comprises at least one of location information of the target sub-band in frequency domain or a link direction indicator of the target sub-band.

In one embodiment, configuration information of the target sub-band comprises at least one of location information of the target sub-band in frequency domain, a link direction indicator of the target sub-band, a subcarrier spacing (SCS) indication, a starting Common Resource Block (CRB) indicator, a number of CRBs comprised or a list of indexes of BWPs comprised.

In one embodiment, configuration information of the target sub-band comprises at least one of location information of the target sub-band in frequency domain, a link direction indicator of the target sub-band, a subcarrier spacing (SCS) indication, a position of a starting PRB in a BWP to which the target sub-band belongs, a number of PRBs comprised or an index or identifier of the BWP to which the target sub-band belongs.

In one embodiment, configuration information of the target sub-band comprises at least one of location information of the target sub-band in frequency domain, a link direction indicator of the target sub-band, a subcarrier spacing (SCS) indication, a position of a starting PRB in a BWP to which the starting PRB belongs, a position of an ending PRB in a BWP to which the ending PRB belongs, an index or identifier of the BWP to which the starting PRB belongs, or an index or identifier of the BWP to which the ending PRB belongs.

In one embodiment, configuration information of the target sub-band is configuration information of the target time-frequency resource set.

In one embodiment, configuration information of the target time-frequency resource set includes configuration information of the target sub-band.

In one embodiment, configuration information of the target sub-band is scheduling information of the target signal.

In one embodiment, configuration information of the target sub-band is information scheduling the target time-frequency resource set.

In one embodiment, configuration information of the target sub-band is configured by a signaling dedicated to the target sub-band.

In one embodiment, configuration information of the target sub-band is configured by a signaling dedicated to a sub-band group to which the target sub-band belongs.

In one embodiment, configuration information of the target sub-band is configured by a configuration signaling configured per subband.

In one embodiment, the statement of "the configuration information of the target sub-band being used to at least determine a slot format for the target sub-band" in the claims includes the following meaning: the configuration information of the target sub-band is used by the first node in the present application to at least determine a slot format for the target sub-band.

In one embodiment, the statement of "the configuration information of the target sub-band being used to at least determine a slot format for the target sub-band" in the claims includes the following meaning: part of or all content contained in the configuration information of the target sub-band is used for explicitly or implicitly indicating a slot format for the target sub-band.

In one embodiment, the statement of "the configuration information of the target sub-band being used to at least determine a slot format for the target sub-band" in the claims includes Claim 5.

In one embodiment, the statement of "the configuration information of the target sub-band being used to at least determine a slot format for the target sub-band" in the claims includes the following meaning: the configuration information of the target sub-band comprises an indication of whether the target sub-band is a sub-band with Flexible Link (FL) or Variable Link (VL), and the indication of whether the target sub-band is a sub-band with FL or VL is used to determine a slot format for the target sub-band.

In one embodiment, the statement of "the configuration information of the target sub-band being used to at least determine a slot format for the target sub-band" in the claims includes the following meaning: the configuration information of the target sub-band comprises an indication of whether a link direction of time-domain symbols configured as an uplink or a downlink by an IE "tdd-UL-DL-Config-Common" is supported in being overridden, and the indication of whether a link direction of time-domain symbols configured as an uplink or a downlink by an IE "tdd-UL-DL-ConfigCommon" is supported in being overridden is used to determine the slot format for the target sub-band.

In one embodiment, the statement of "the configuration information of the target sub-band being used to at least determine a slot format for the target sub-band" in the claims includes the following meaning: the configuration information of the target sub-band comprises an indication of whether a link direction of time-domain symbols configured as an uplink or a downlink by an IE "tdd-UL-DL-Con-figDedicated" is supported in being overridden, and the indication of whether a link direction of time-domain symbols configured as an uplink or a downlink by an IE "tdd-UL-DL-ConfigDedicated" is supported in being overridden is used to determine the slot format for the target sub-band.

In one embodiment, the statement of "the configuration information of the target sub-band being used to at least determine a slot format for the target sub-band" in the claims includes the following meaning: the configuration information of the target sub-band comprises an indication of whether the target sub-band supporting multiple link directions, and the indication of whether the target sub-band supporting multiple link directions is used to determine a slot format for the target sub-band.

In one embodiment, Slot Formats for the target sub-band include a slot format applicable to the target sub-band.

In one embodiment, Slot Formats for the target sub-band include a slot format that a transmission of a channel or a signal by which frequency-domain resources occupied belong to the target sub-band conforms with in time domain.

In one embodiment, Slot Formats for the target sub-band include a slot format configured by configuration information specific or dedicated to the target sub-band.

In one embodiment, Slot Formats for the target sub-band include a slot format that a time-domain symbol occupied by a transmission by which at least one subcarrier occupied in frequency domain belongs to the target sub-band satisfies.

In one embodiment, Slot Formats for the target sub-band include a link direction that a time-domain symbol occupied by a transmission by which at least one subcarrier occupied in frequency domain belongs to the target sub-band satisfies.

In one embodiment, Slot Formats for the target sub-band include a slot format satisfied by a link direction of a time-domain symbol occupied in time domain by a channel or a signal that has at least one subcarrier overlapped with the target sub-band in frequency domain.

In one embodiment, a Slot Format for the target sub-band is specific or dedicated to the target sub-band.

In one embodiment, a Slot Format for a sub-band other than the target sub-band may or may not be identical to a Slot Format for the target sub-band.

In one embodiment, whether a Slot Format for a sub-band other than the target sub-band is identical to a Slot Format for the target sub-band is up to the network-side configuration.

In one embodiment, Slot Formats for the target sub-band include all slot formats for the target sub-band.

In one embodiment, Slot Formats for the target sub-band include any slot format for the target sub-band.

In one embodiment, the slot format includes a number of uplink time-domain symbols and a number of downlink time-domain symbols in a slot.

In one embodiment, the slot format includes a number of uplink time-domain symbols and a number of downlink time-domain symbols in a slot as well as an order in which uplink and downlink time-domain symbols are sorted.

In one embodiment, the slot format is a distribution pattern of uplink and downlink time-domain symbols and flexible time-domain symbols.

In one embodiment, the slot format is a distribution pattern of uplink and downlink time-domain symbols and flexible time-domain symbols within a time period.

In one embodiment, the slot format is a distribution pattern of uplink and downlink time-domain symbols and flexible time-domain symbols within a time period, the distribution pattern being periodically repeated in time domain.

In one embodiment, the slot format includes a number of uplink time-domain symbols and a distribution pattern of downlink time-domain symbols in a slot.

In one embodiment, the slot format includes respective numbers of and a distribution pattern of uplink and downlink time-domain symbols in a slot.

In one embodiment, the slot format includes a distribution pattern of uplink and downlink time-domain symbols and flexible time-domain symbols in a target time window. In one subsidiary example of the above embodiment, the target time window is a slot. In one subsidiary example of the above embodiment, the target time window is a subframe. In one subsidiary example of the above embodiment, the target time window is 2 frames. In one subsidiary example of the above embodiment, the target time window is pre-defined. In one subsidiary example of the above embodiment, the target time window is explicitly or implicitly configured. In one subsidiary example of the above embodiment, the distribution pattern of uplink and downlink time-domain symbols and flexible time-domain symbols in the target time window is periodically repeated.

In one embodiment, any time-domain symbol other than uplink and downlink time-domain symbols in a slot format is a flexible time-domain symbol.

In one embodiment, the first signaling comprises higher-layer information or higher-layer parameter configuration.

In one embodiment, the first signaling comprises one or more Information Elements (IEs) comprised by a Radio Resource Control (RRC) layer signaling, or the first information block comprises one or more fields comprised by an RRC layer signaling.

In one embodiment, the first signaling comprises physical-layer information or physical-layer parameter configuration.

In one embodiment, the first signaling comprises one or more fields in a DCI format.

In one embodiment, the first signaling is transmitted through a PDCCH.

In one embodiment, the first signaling comprises a UL Grant in a Random Access Response (RAR).

In one embodiment, the first signaling comprises a UL Grant in a fallback Random Access Response (RAR).

In one embodiment, the first signaling comprises a Success RAR.

In one embodiment, the first signaling comprises an IE "ConfiguredGrantConfig".

In one embodiment, the first signaling comprises an IE "SPS-Config".

In one embodiment, the first signaling comprises part of or all fields comprised by a Master Information Block (MIB).

In one embodiment, the first signaling comprises part of or all fields comprised by a System Information Block (SIB).

In one embodiment, the first signaling is UE specific or UE dedicated.

In one embodiment, the first signaling is Cell Common or Cell specific.

In one embodiment, the first signaling is Group Common.

In one embodiment, the statement in the claims of "the first signaling being used to determine the target time-frequency resource set" includes the following meaning: the first signaling is used by the first node in the present application to determine the target time-frequency resource set.

In one embodiment, the statement in the claims of "the first signaling being used to determine the target time-frequency resource set" includes the following meaning: the first signaling is used for explicitly or implicitly indicating the target time-frequency resource set.

In one embodiment, the statement in the claims of "the first signaling being used to determine the target time-frequency resource set" includes the following meaning: one or multiple fields or IEs comprised by the first signaling is(are) used to determine the target time-frequency resource set.

In one embodiment, any time-domain symbol comprised by the target time-frequency resource set in time domain is an Orthogonal Frequency Division Multiplexing (OFDM) symbol.

In one embodiment, any time-domain symbol comprised by the target time-frequency resource set in time domain is a DFT-s-OFDM symbol.

In one embodiment, the target time-frequency resource set comprises only one time-domain symbol in time domain.

In one embodiment, the target time-frequency resource set comprises multiple time-domain symbols in time domain.

In one embodiment, any Resource Block (RB) comprised by the target time-frequency resource set in frequency domain is a Physical Resource Block (PRB).

In one embodiment, any Resource Block (RB) comprised by the target time-frequency resource set in frequency domain is an equivalent RB.

In one embodiment, any Resource Block (RB) comprised by the target time-frequency resource set in frequency domain is a Common Resource Block (CRB).

In one embodiment, any Resource Block (RB) comprised by the target time-frequency resource set in frequency domain is a Virtual Resource Block (VRB).

In one embodiment, any Resource Block (RB) comprised by the target time-frequency resource set in frequency domain comprises 12 consecutive subcarriers.

In one embodiment, any Resource Block (RB) comprised by the target time-frequency resource set in frequency domain comprises 12 consecutive subcarriers for one subcarrier spacing (SCS).

In one embodiment, the target time-frequency resource set comprises only one resource block in frequency domain.

In one embodiment, the target time-frequency resource set comprises multiple resource blocks infrequency domain.

In one embodiment, the target time-frequency resource set comprises consecutive frequency-domain resources in frequency domain.

In one embodiment, the target time-frequency resource set comprises discrete frequency-domain resources in frequency domain.

In one embodiment, the target time-frequency resource set comprises frequency-hopping frequency-domain resources in frequency domain.

In one embodiment, the target time-frequency resource set comprises frequency-domain resources per hop when using frequency hopping in frequency domain.

In one embodiment, the target time-frequency resource set comprises consecutive time-domain resources in time domain.

In one embodiment, the target time-frequency resource set comprises discrete time-domain resources in time domain.

In one embodiment, the target time-frequency resource set comprises consecutive OFDM symbols in time domain.

In one embodiment, the target time-frequency resource set is configured by a DCI format or a piece of higher-layer information.

In one embodiment, the target signal is a Baseband Signal or a Radio Frequency Signal.

In one embodiment, the target signal is transmitted via an air interface or a wireless interface.

In one embodiment, the target signal carries an Uplink Shared Channel (UL-SCH).

In one embodiment, the target signal is transmitted through a Physical Uplink Shared Channel (PUSCH).

In one embodiment, the target signal comprises a Configured Grant (CG) PUSCH.

In one embodiment, the target signal comprises a PUSCH and a DeModulation Reference Signal (DMRS).

In one embodiment, the target signal is transmitted through a Physical Uplink Control Channel (PUCCH).

In one embodiment, the target signal comprises a PUCCH and a DMRS.

In one embodiment, the target signal comprises a Sounding Reference Signal (SRS).

In one embodiment, the target signal comprises a Physical Random Access CHannel (PRACH).

In one embodiment, the target signal comprises a Physical Random Access Channel (PRACH) configured by a PDCCH Order.

In one embodiment, the target signal carries an Msg3 or an MsgA.

In one embodiment, the target signal occupies all or part of REs comprised by the target time-frequency resource set.

In one embodiment, the target Tx power is measured in dBm.

In one embodiment, the target Tx power is a normalized transmit power, and the first Tx power is a normalized transmit power.

In one embodiment, the target Tx power is a transmit power at an antenna connector, and the first Tx power is a transmit power at the antenna connector.

In one embodiment, the target Tx power is a transmit power including antenna gains, and the first Tx power is a transmit power including antenna gains.

In one embodiment, the target Tx power is a transmit power excluding antenna gains, and the first Tx power is a transmit power excluding antenna gains.

In one embodiment, the target Tx power is an equivalent isotropic radiated power (EIRP), and the first Tx power is an EIRP.

In one embodiment, each of the target Tx power and the first Tx power is a normalized transmit power for the target signal, where the normalization refers to averaging the energy of all constellation points in a modulation scheme.

In one embodiment, the target Tx power is $P_{signal,b,f,c}$, where the signal represents the target signal, and b represents a Bandwidth Part (BWP) to which the target signal belongs, and f represents a carrier to which the target signal belongs in frequency domain, and c represents a serving cell to which the target signal belongs.

In one embodiment, the first Tx power is measured in dBm.

In one embodiment, the first Tx power is a calculated possible transmit power of the target signal.

In one embodiment, the first Tx power is a transmit power expected by the target signal.

In one embodiment, the first Tx power is a candidate transmit power of the target signal.

In one embodiment, the first Tx power is a candidate transmit power calculated in Power Control.

In one embodiment, the first Tx power is an output power of the Baseband.

In one embodiment, the first Tx power is a transmit power calculated based on a target SINR, a pathloss compensation, a bandwidth factor and closed loop power control parameters.

In one embodiment, the first Tx power includes an open loop power control part and a closed loop power control part.

In one embodiment, the target power upper limit is $P_{CMAX,f,c}$.

In one embodiment, the target power upper limit is a Configured transmitted power.

In one embodiment, the target power upper limit is a Configured maximum output power.

In one embodiment, the target power upper limit is a maximum output power defined by Radio Frequency (RF).

In one embodiment, the target power upper limit is a maximum output power of a Minimum Radio Frequency (RF) Requirement.

In one embodiment, the target power upper limit is measured in dBm.

In one embodiment, the target power upper limit is a maximum value that can be reached by the target Tx power.

In one embodiment, the first Tx power could be greater than the target power upper limit, or less than the target power upper limit, or equal to the target power upper limit.

In one embodiment, the first parameter value is expressed in dB.

In one embodiment, a subcarrier spacing (SCS) of subcarriers occupied by the target signal in frequency domain is used to determine the first parameter value.

In one embodiment, the first parameter value is used for ensuring a flat Power Spectrum Density (PSD).

In one embodiment, the first parameter value is a parameter value for providing a constant PSD.

In one embodiment, the statement that "a number of resource blocks comprised by the target time-frequency resource set in frequency domain is used to determine a first parameter value" in the claims includes the following meaning: the number of resource blocks comprised by the target time-frequency resource set in frequency domain is used by the first node in the present application to determine the first parameter value.

In one embodiment, the statement that "a number of resource blocks comprised by the target time-frequency resource set in frequency domain is used to determine a first parameter value" in the claims includes the following meaning: the number of resource blocks comprised by the target time-frequency resource set in frequency domain is used for calculating the first parameter value.

In one embodiment, the statement that "a number of resource blocks comprised by the target time-frequency resource set in frequency domain is used to determine a first parameter value" in the claims includes the following meaning: the number of resource blocks comprised by the target time-frequency resource set in frequency domain is used for calculating a bandwidth occupied by the target time-frequency resource set in frequency domain, and the bandwidth occupied by the target time-frequency resource set in frequency domain is used for calculating the first parameter value.

In one embodiment, the statement that "a number of resource blocks comprised by the target time-frequency resource set in frequency domain is used to determine a first parameter value" in the claims includes the following meaning: the number of resource blocks comprised by the target time-frequency resource set in frequency domain is used together with a subcarrier spacing (SCS) of subcarriers occupied by the target signal in frequency domain to determine the first parameter value.

In one embodiment, the statement that "a number of resource blocks comprised by the target time-frequency resource set in frequency domain is used to determine a first parameter value" in the claims includes the following meaning: the first parameter value is equal to $\log_{10}(2^{\mu} \cdot M_{RB,b,f,c})$, where $\mu$ represents an index of a subcarrier spacing (SCS) of subcarriers occupied by the target signal in frequency domain, and $M_{RB,b,f,c}$ represents the number of resource blocks comprised by the target time-frequency resource set in frequency domain.

In one embodiment, the statement that "a number of resource blocks comprised by the target time-frequency resource set in frequency domain is used to determine a first parameter value" in the claims includes the following meaning: the first parameter value is equal to $10 \log_{10}(2^{\mu} \cdot M_{RB,b,f,c})$, where $\mu$ represents an index of a subcarrier spacing (SCS) of subcarriers occupied by the target signal in frequency domain, and $M_{RB,b,f,c}$ represents the number of resource blocks comprised by the target time-frequency resource set in frequency domain.

In one embodiment, a correlation coefficient of linear correlation between the first Tx power and the first parameter value is greater than 0.

In one embodiment, a correlation coefficient of linear correlation between the first Tx power and the first parameter value is equal to 1.

In one embodiment, a correlation coefficient of linear correlation between the first Tx power and the first parameter value is equal to 10.

In one embodiment, a Pathloss (PL) between a transmitter of the target signal and a transmitter of the first information block is used to determine the first Tx power.

In one embodiment, a target received SINR of the target signal is used to determine the first Tx power.

In one embodiment, a power class of a transmitter of the target signal is an index value.

In one embodiment, a power class of a transmitter of the target signal is a power class when transmitting the target signal.

In one embodiment, a power class of a transmitter of the target signal is a power class of a transmitter of the target signal in a frequency range (FR) to which the target time-frequency resource set belongs in frequency domain.

In one embodiment, a power class of a transmitter of the target signal is used for defining a maximum output power for any transmission bandwidth within a channel bandwidth.

In one embodiment, a power class of a transmitter of the target signal is used for defining a maximum output radiated power for any transmission bandwidth within a channel bandwidth.

In one embodiment, a power class of a transmitter of the target signal is used for defining a maximum output EIRP for any transmission bandwidth within a channel bandwidth.

In one embodiment, a power class of a transmitter of the target signal is a positive integer.

In one embodiment, a power class of a transmitter of the target signal is greater than 0.

In one embodiment, a power class of a transmitter of the target signal is equal to one of 1, 1.5, 2 or 3.

In one embodiment, a power class of a transmitter of the target signal is equal to one of 1, 2, 3, 4 or 5.

In one embodiment, a power class of a transmitter of the target signal belongs to either a first power class set or a second power class set, where the first power class set comprises multiple power classes, and the second power class set comprises multiple power classes; a frequency range (FR) to which the target time-frequency resource set belongs in frequency domain is used to determine a power class set to which the power class of the transmitter of the target signal belongs from the first power class set or the second power class set.

In one embodiment, a power class of a transmitter of the target signal is used for indexing a nominal maximum output power of the transmitter of the target signal.

In one embodiment, a power class of a transmitter of the target signal is used for indexing a nominal maximum radiated power of the transmitter of the target signal.

In one embodiment, a maximum output power indexed by a power class of a transmitter of the target signal does not include a tolerance value.

In one embodiment, an EIRP indexed by a power class of a transmitter of the target signal does not include a tolerance value.

In one embodiment, the second parameter value is an output power value.

In one embodiment, the second parameter value is measured in dBm.

In one embodiment, the second parameter value is a radiated power value.

In one embodiment, the second parameter value is an EIRP value.

In one embodiment, the second parameter value is a max EIRP value or a m EIRP value.

In one embodiment, the statement that "a power class of a transmitter of the target signal is used to determine a second parameter value" in the claims includes the following meaning: the power class of the transmitter of the target signal is used by the first node in the present application to determine the second parameter value.

In one embodiment, the statement that "a power class of a transmitter of the target signal is used to determine a second parameter value" in the claims includes the following meaning: the second parameter value is equal to a maximum output power value indexed or identified by the power class of the transmitter of the target signal.

In one embodiment, the statement that "a power class of a transmitter of the target signal is used to determine a second parameter value" in the claims includes the following meaning: the second parameter value is equal to a maximum output radiated power value indexed or identified by the power class of the transmitter of the target signal.

In one embodiment, the statement that "a power class of a transmitter of the target signal is used to determine a second parameter value" in the claims includes the following meaning: the second parameter value is equal to a tolerance-value-excluding maximum output power value indexed or identified by the power class of the transmitter of the target signal.

In one embodiment, the statement that "a power class of a transmitter of the target signal is used to determine a second parameter value" in the claims includes the following meaning: the power class of the transmitter of the target signal belongs to a target power class set, the target power class set comprising multiple power classes, and any power class in the target power class set is used for indexing or identifying a maximum output power value, and the second parameter value is equal to a maximum output power value indexed or identified by the power class of the transmitter of the target signal. In one subsidiary embodiment of the above embodiment, a frequency range (FR) to which the target time-frequency resource set belongs in frequency domain is used to determine the target power class set.

In one embodiment, the statement that "a power class of a transmitter of the target signal is used to determine a second parameter value" in the claims includes the following meaning: the second parameter value corresponds to the power class of the transmitter of the target signal.

In one embodiment, a value range of the target power upper limit is a power value interval.

In one embodiment, a value range of the target power upper limit is a power value set.

In one embodiment, a value range of the target power upper limit is a closed interval of power values.

In one embodiment, a value range of the target power upper limit is a set of candidate values of the target power upper limit.

In one embodiment, a value range of the target power upper limit is a value range defined between a maximum candidate value and a minimum candidate value of the target power upper limit.

In one embodiment, the transmitter of the target signal is allowed to set the target power upper limit within the value range of the target power upper limit.

In one embodiment, the transmitter of the target signal itself sets the target power upper limit within the value range of the target power upper limit.

In one embodiment, the transmitter of the target signal sets the target power upper limit at random within the value range of the target power upper limit.

In one embodiment, a receiver of the target signal is not aware of the target power upper limit set within the value range of the target power upper limit by the transmitter of the target signal.

In one embodiment, a value range of the target power upper limit is a power value interval confined between the first boundary value and the second boundary value in the present application.

In one embodiment, a value range of the target power upper limit is a power value interval confined between the first boundary value and the second boundary value inclusive in the present application.

In one embodiment, the statement of "the second parameter value being used to determine a value range of the target power upper limit" in the claims includes a meaning that: the second parameter value is used by the first node in the present application to determine the value range of the target power upper limit.

In one embodiment, the statement of "the second parameter value being used to determine a value range of the target power upper limit" in the claims includes a meaning that: the second parameter value is used for calculating the value range of the target power upper limit.

In one embodiment, the statement of "the second parameter value being used to determine a value range of the target power upper limit" in the claims includes a meaning that: the second parameter value is used to determine a maximum boundary value of the value range of the target power upper limit.

In one embodiment, the statement of "the second parameter value being used to determine a value range of the target power upper limit" in the claims includes a meaning that: the second parameter value is used to determine a minimum boundary value of the value range of the target power upper limit.

In one embodiment, the statement of "the second parameter value being used to determine a value range of the target power upper limit" in the claims includes a meaning that: the second parameter value is used to determine a maximum boundary value and a minimum boundary value of the value range of the target power upper limit.

In one embodiment, the statement of "the second parameter value being used to determine a value range of the target power upper limit" in the claims is implemented by means of Claim 3.

In one embodiment, C1 is equal to 2.

In one embodiment, C1 is greater than 2.

In one embodiment, any candidate parameter value among the C1 candidate parameter values is expressed in dB.

In one embodiment, any candidate parameter value among the C1 candidate parameter values is measured in dB.

In one embodiment, any candidate parameter value among the C1 candidate parameter values is greater than 0.

In one embodiment, any candidate parameter value among the C1 candidate parameter values is less than 0.

In one embodiment, among the C1 candidate parameter values there exists one candidate parameter value greater than 0 and one candidate parameter value less than 0.

In one embodiment, the target parameter is greater than 0.

In one embodiment, the target parameter is less than 0.

In one embodiment, any candidate parameter value among the C1 candidate parameter values is a maximum power reduction (MPR) value.

In one embodiment, any candidate parameter value among the C1 candidate parameter values is an additional maximum power reduction (A-MPR) value.

In one embodiment, any candidate parameter value among the C1 candidate parameter values is a power management maximum power reduction (P-MPR) value.

In one embodiment, any candidate parameter value among the C1 candidate parameter values is a value of $\Delta T_{C,c}$.

In one embodiment, any candidate parameter value among the C1 candidate parameter values is a value of $\Delta T_{IB,c}$.

In one embodiment, any candidate parameter value among the C1 candidate parameter values is a value of $P_{O\_signal,b,f,c}$, where the signal represents the target signal, and b represents a Bandwidth Part (BWP) to which the target signal belongs, and f represents a carrier to which the target signal belongs in frequency domain, and c represents a serving cell to which the target signal belongs.

In one embodiment, any candidate parameter value among the C1 candidate parameter values is a value of $P_{O\_NOMINAL\_signal,f,c}$, where the signal represents the target signal, and f represents a carrier to which the target signal belongs in frequency domain, and c represents a serving cell to which the target signal belongs.

In one embodiment, any candidate parameter value among the C1 candidate parameter values is a value of $\Delta_{Flexible\_signal}$, where the signal represents the target signal.

In one embodiment, there is one candidate parameter value among the C1 candidate parameter values being equal to a sum of another candidate parameter value plus an offset value.

In one embodiment, the C1 candidate parameter values are respectively equal to sums of C1 offset values plus a reference parameter value. In one subsidiary embodiment of the above embodiment, the reference parameter value is pre-defined. In one subsidiary embodiment of the above embodiment, the reference parameter value is explicitly or implicitly configured. In one subsidiary embodiment of the above embodiment, the C1 offset values are pre-defined. In one subsidiary embodiment of the above embodiment, the C1 offset values are explicitly or implicitly configured. In one subsidiary embodiment of the above embodiment, there is one offset value equal to 0 among the C1 offset values. In one subsidiary embodiment of the above embodiment, that C1 is greater than 1 is explicitly or implicitly determined; when C1 is greater than 1, the C1 offset values are pre-defined or explicitly configured or implicitly configured.

In one embodiment, the target parameter value and the first parameter value are not two values of a same parameter.

In one embodiment, the target parameter value and the second parameter value are not two values of a same parameter.

In one embodiment, the target parameter value is unequal to the first parameter value, and the target parameter value is unequal to the second parameter value.

In one embodiment, the target parameter value may or may not be equal to the first parameter value, and the target parameter value may or may not be equal to the second parameter value.

In one embodiment, implicit or explicit signaling configuration is used to determine whether the target parameter value is equal to the first parameter value.

In one embodiment, implicit or explicit signaling configuration is used to determine whether the target parameter value is equal to the second parameter value.

In one embodiment, the target parameter value and the first parameter value are values of two independent parameters.

In one embodiment, the target parameter value and the second parameter value are values of two independent parameters.

In one embodiment, the target parameter value and the first parameter value are values of two different types of parameters.

In one embodiment, the target parameter value and the second parameter value are values of two different types of parameters.

In one embodiment, the target parameter value is unrelated to the first parameter value.

In one embodiment, the target parameter value is unrelated to the second parameter value.

In one embodiment, the target parameter value and the first parameter value are values of two separately defined parameters.

In one embodiment, the target parameter value and the second parameter value are values of two separately defined parameters.

In one embodiment, the target parameter value and the first parameter value are values of two separately defined parameters, and the target parameter value may or may not be linked with the first parameter value.

In one embodiment, the target parameter value and the second parameter value are values of two separately defined parameters, and the target parameter value may or may not be linked with the second parameter value.

In one embodiment, the statement in the claims that "a target parameter value is used to determine at least one of the value range of the target power upper limit or the first Tx power" includes the following meaning: the target parameter value is used by the first node in the present application to determine at least one of the value range of the target power upper limit or the first Tx power.

In one embodiment, the statement in the claims that "a target parameter value is used to determine at least one of the value range of the target power upper limit or the first Tx power" includes the following meaning: the target parameter value is used for calculating at least one of the value range of the target power upper limit or the first Tx power.

In one embodiment, the statement in the claims that "a target parameter value is used to determine at least one of the value range of the target power upper limit or the first Tx power" includes the following meaning: the target parameter value is used to determine the value range of the target power upper limit and the first Tx power.

In one embodiment, the statement in the claims that "a target parameter value is used to determine at least one of the value range of the target power upper limit or the first Tx power" includes the following meaning: the target parameter value is used to determine the value range of the target power upper limit.

In one embodiment, the statement in the claims that "a target parameter value is used to determine at least one of the value range of the target power upper limit or the first Tx power" includes the following meaning: the target parameter value is used to determine the first Tx power.

In one embodiment, the statement in the claims that "a target parameter value is used to determine at least one of the value range of the target power upper limit or the first Tx power" includes the following meaning: the target parameter value is used to determine at least one of a maximum boundary value or a minimum boundary value of the value range of the target power upper limit.

In one embodiment, the statement in the claims that "a target parameter value is used to determine at least one of the value range of the target power upper limit or the first Tx power" is implemented by means of Claim 3 in the present application.

In one embodiment, the statement in the claims that "a target parameter value is used to determine at least one of the value range of the target power upper limit or the first Tx power" is implemented by means of Claim 7 in the present application.

In one embodiment, the statement in the claims that "a target parameter value is used to determine at least one of the value range of the target power upper limit or the first Tx power" includes the following meaning: the first Tx power is linear with the target parameter value.

In one embodiment, the statement in the claims that "a target parameter value is used to determine at least one of the value range of the target power upper limit or the first Tx power" includes the following meaning: the target parameter value is used to determine a value of $P_{O\_NOMINAL\_signal,f,c}$, and the value of $P_{O\_NOMINAL\_signal,f,c}$ is used to determine the first Tx power.

In one embodiment, the statement in the claims that "a target parameter value is used to determine at least one of the value range of the target power upper limit or the first Tx power" includes the following meaning: the target parameter value is used to determine a value of $P_{O\_signal,b,f,c}$, and the value of $P_{O\_signal,b,f,c}$ is used to determine the first Tx power.

In one embodiment, the statement in the claims that "a target parameter value is used to determine at least one of the value range of the target power upper limit or the first Tx power" includes the following meaning: the target parameter value is used to determine an indirect parameter value, and the indirect parameter value is used to determine the first Tx power.

In one embodiment, the statement in the claims that "a target parameter value is used to determine at least one of the value range of the target power upper limit or the first Tx power" includes the following meaning: the target parameter value is used to determine an indirect parameter value, the first Tx power being linear with the indirect parameter value.

In one embodiment, the statement in the claims that "a target parameter value is used to determine at least one of the value range of the target power upper limit or the first Tx power" includes the following meaning: the first Tx power $P_{temp\_signal,b,f,c}$ satisfies:

$$P_{temp\_signal,b,f,c} = P_{O\_signal,b,f,c} + 10 \log_{10}(2^{\mu} \cdot M_{RB,b,f,c}) + \alpha_{b,f,c} \cdot PL_{b,f,c} + \varphi_{b,f,c}$$

where $P_{O\_signal,b,f,c}$ represents the target parameter, and $10 \log_{10}(2^{\mu} \cdot M_{RB,b,f,c})$ represents the first parameter value, and $\alpha_{b,f,c}$ represents a pathloss factor, and $PL_{b,f,c}$ represents a pathloss, and $\varphi_{b,f,c}$ represents other pre-defined or configurable parameter; the signal represents the target signal, and b represents a Bandwidth Part (BWP) to which the target signal belongs, and f represents a carrier to which the target signal belongs in frequency domain, and c represents a serving cell to which the target signal belongs.

In one embodiment, the statement in the claims that "a target parameter value is used to determine at least one of the value range of the target power upper limit or the first Tx power" includes the following meaning: the first Tx power $P_{temp\_signal,b,f,c}$ satisfies:

$$P_{temp\_signal,b,f,c} = P_{O\_signal,b,f,c} + 10 \log_{10}(2^{\mu} \cdot M_{RB,b,f,c}) + \alpha_{b,f,c} \cdot PL_{b,f,c} + \varphi_{b,f,c}$$

$$P_{O\_signal,b,f,c} = P_{O\_UE\_signal,b,f,c} + P_{O\_NOMINAL\_signal,f,c}$$

where $P_{O\_NOMINAL\_signal,f,c}$ represents the target parameter, and $10 \log_{10} (2^{\mu} \cdot M_{RB,b,f,c})$ represents the first parameter value, and $P_{O\_UE\_signal,b,f,c}$ represents a configurable parameter, and $\alpha_{b,f,c}$ represents a pathloss factor, and $PL_{b,f,c}$ represents a pathloss, and $\varphi_{b,f,c}$ represents other pre-defined or configurable parameter; the signal represents the target signal, and b represents a Bandwidth Part (BWP) to which the target signal belongs, and f represents a carrier to which the target signal belongs in frequency domain, and c represents a serving cell to which the target signal belongs.

In one embodiment, the statement in the claims that "a target parameter value is used to determine at least one of the value range of the target power upper limit or the first Tx power" includes the following meaning: the first Tx power $P_{temp\_signal,b,f,c}$ satisfies:

$$P_{temp\_signal,b,f,c}=P_{O\_signal,b,f,c}+10\ \log_{10}(2^{\mu}\cdot M_{RB,b,f,c})+\alpha_{b,f,c}\cdot PL_{b,f,c}+\varphi_{b,f,c}$$

$$P_{O\_signal,b,f,c}=P_{O\_UE\_signal,b,f,c}+P_{O\_NOMINAL\_signal,f,c}$$

$$P_{O\_NOMINAL\_signal,f,c}=P_{O\_Flexible}+\Delta_{Flexible\_signal}$$

where $\Delta_{Flexible\_signal}$ represents the target parameter, and $P_{O\_Flexible}$ represents a configured parameter for the target sub-band, and $10\ \log_{10}\ (2^{\mu}\cdot M_{RB,b,f,c})$ represents the first parameter value, and $P_{O\_UE\_signal,b,f,c}$ represents a configurable parameter, and $\alpha_{b,f,c}$ represents a pathloss factor, and $PL_{b,f,c}$ represents a pathloss, and $\varphi_{b,f,c}$ represents other pre-defined or configurable parameter; the signal represents the target signal, and b represents a Bandwidth Part (BWP) to which the target signal belongs, and f represents a carrier to which the target signal belongs in frequency domain, and c represents a serving cell to which the target signal belongs.

In one embodiment, the statement in the claims that "a target parameter value is used to determine at least one of the value range of the target power upper limit or the first Tx power" includes the following meaning: a maximum boundary value $P_{CMAX\_H,f,c}$ of the value range of the target power upper limit satisfies:

$$P_{CMAX\_H,f,c}=MIN\{P_{EMAX,c},P_{PowerClass}-\Delta P_{PowerClass}-\Delta_{Flexible_{signal}}\}$$

where $P_{EMAX,c}$ is a configured value, and $P_{PowerClass}$ represents the second parameter value, and $\Delta P_{PowerClass}$ represents a power offset value, and $\Delta_{Flexible\_signal}$ represents the target parameter.

In one embodiment, the statement in the claims that "a target parameter value is used to determine at least one of the value range of the target power upper limit or the first Tx power" includes the following meaning: a minimum boundary value $P_{CMAX\_L,f,c}$ of the value range of the target power upper limit satisfies:

$$P_{CMAX\_L,f,c}=MIN\{P_{EMAX,c}-\Delta_{Flexible\_signal}, (P_{PowerClass}-\Delta P_{PowerClass})-MAX(MAX(MPR_{c}+\Delta MPR_{c}, A-MPR_{c})+\Delta T_{IB,c}+\Delta_{Flexible\_signal}+\Delta T_{RxSRS},P-MPR_{c})\}$$

where $P_{EMAX,c}$ is a configured value, and $P_{PowerClass}$ represents the second parameter value, and $\Delta P_{PowerClass}$ represents a power offset value, and $\Delta_{Flexible\_signal}$ represents the target parameter; $MPR_{c}$ indicates a MPR value, and A-MPR$_{c}$ indicates an A-MPR value, and $\Delta MPR_{c}$, indicates a MPR offset value, and P-MPR$_{c}$ indicates a P-MPR value, and $\Delta T_{IB,c}$ indicates a tolerance value, and $\Delta T_{RxSRS}$ indicates an offset value of SRS.

In one embodiment, the statement in the claims that "a target parameter value is used to determine at least one of the value range of the target power upper limit or the first Tx power" includes the following meaning: a minimum boundary value $P_{CMAX\_L,f,c}$ of the value range of the target power upper limit satisfies:

$$P_{CMAX\_L,f,c}=MIN\{P_{EMAX,c}-\Delta T_{C,c}, (P_{PowerClass}-\Delta P_{PowerClass})-MAX(MAX(MPR_{c}+\Delta MPR_{c},A-MPR_{c})+\Delta T_{IB,c}+\Delta T_{C,c}+\Delta T_{RxSRS},P-MPR_{c})\}$$

where $\Delta T_{C,c}=\Delta T_{Flex,C,c}+\Delta_{Flexible\_signal}$ where $\Delta T_{Flex,C,c}$ indicates a value related to either the first frequency interval or the second frequency interval in the present application; $P_{EMAX,c}$ is a configured value, and $P_{PowerClass}$ represents the second parameter value, and $\Delta P_{PowerClass}$ represents a power offset value, and $\Delta_{Flexible\_signal}$ represents the target parameter; $MPR_{c}$ indicates a MPR value, and A-MPR$_{c}$ indicates an A-MPR value, and $\Delta MPR_{c}$, indicates a MPR offset value, and P-MPR$_{c}$ indicates a P-MPR value, and $\Delta T_{IB,c}$ indicates a tolerance value, and $\Delta T_{RxSRS}$ indicates an offset value of SRS.

In one embodiment, the relation between the target time-frequency resource set and the target sub-band includes: whether the target time-frequency resource set belongs to the target sub-band in frequency domain.

In one embodiment, the relation between the target time-frequency resource set and the target sub-band includes: whether the target time-frequency resource set is orthogonal with the target sub-band in frequency domain.

In one embodiment, the relation between the target time-frequency resource set and the target sub-band includes: whether there is at least one overlapped subcarrier between the target time-frequency resource set and the target sub-band in frequency domain.

In one embodiment, the relation between the target time-frequency resource set and the target sub-band includes: whether each resource block comprised by the target time-frequency resource set in frequency domain belongs to the target sub-band.

In one embodiment, the target time-frequency resource set belongs to the target sub-band in frequency domain, and the relation between the target time-frequency resource set and the target sub-band includes: a position of each resource block comprised by the target time-frequency resource set in frequency domain in the target sub-band.

In one embodiment, the target time-frequency resource set belongs to the target sub-band in frequency domain, and the relation between the target time-frequency resource set and the target sub-band includes: the distribution of each resource block comprised by the target time-frequency resource set in frequency domain in the target sub-band.

In one embodiment, the relation between the target time-frequency resource set and the target sub-band includes: whether the target time-frequency resource set belongs to the target sub-band in frequency domain, and a position of each resource block comprised by the target time-frequency resource set in frequency domain in the target sub-band when the target time-frequency resource set belongs to the target sub-band in frequency domain.

In one embodiment, the relation between the target time-frequency resource set and the target sub-band includes: whether the target time-frequency resource set belongs to the target sub-band in frequency domain, and whether the target time-frequency resource set comprises a subcarrier in frequency domain located in either the first frequency interval or the second frequency interval in the present application when the target time-frequency resource set belongs to the target sub-band in frequency domain.

In one embodiment, the relation between the target time-frequency resource set and the target sub-band includes: whether the target time-frequency resource set comprises a subcarrier in frequency domain located in either the first frequency interval or the second frequency interval in the present application.

In one embodiment, the statement in the claims that "at least one of a relation between the target time-frequency resource set and the target sub-band or the configuration information of the target sub-band is used to determine the target parameter value out of the C1 candidate parameter values" includes the following meaning: at least one of the relation between the target time-frequency resource set and the target sub-band or the configuration information of the target sub-band is used by the first node in the present application to determine the target parameter value out of the C1 candidate parameter values.

In one embodiment, the statement in the claims that "at least one of a relation between the target time-frequency resource set and the target sub-band or the configuration information of the target sub-band is used to determine the target parameter value out of the C1 candidate parameter values" includes the following meaning: the relation between the target time-frequency resource set and the target sub-band is used to determine the target parameter value out of the C1 candidate parameter values.

In one embodiment, the statement in the claims that "at least one of a relation between the target time-frequency resource set and the target sub-band or the configuration information of the target sub-band is used to determine the target parameter value out of the C1 candidate parameter values" includes the following meaning: the relation between the target time-frequency resource set and the target sub-band and the configuration information of the target sub-band are used together to determine the target parameter value out of the C1 candidate parameter values.

In one embodiment, the statement in the claims that "at least one of a relation between the target time-frequency resource set and the target sub-band or the configuration information of the target sub-band is used to determine the target parameter value out of the C1 candidate parameter values" includes the following meaning: the configuration information of the target sub-band is used to determine the target parameter value out of the C1 candidate parameter values.

In one embodiment, the statement in the claims that "at least one of a relation between the target time-frequency resource set and the target sub-band or the configuration information of the target sub-band is used to determine the target parameter value out of the C1 candidate parameter values" is implemented by means of Claim 4 in the present application.

In one embodiment, the statement in the claims that "at least one of a relation between the target time-frequency resource set and the target sub-band or the configuration information of the target sub-band is used to determine the target parameter value out of the C1 candidate parameter values" is implemented by means of Claim 5 in the present application.

In one embodiment, the statement in the claims that "at least one of a relation between the target time-frequency resource set and the target sub-band or the configuration information of the target sub-band is used to determine the target parameter value out of the C1 candidate parameter values" includes the following meaning: when the configuration information of the target sub-band explicitly or implicitly comprises a first state of the target sub-band, and when there is at least one overlapped subcarrier between the target time-frequency resource set and the target sub-band in frequency domain, the target parameter value is equal to a first candidate parameter value among the C1 candidate parameter values; otherwise, the target parameter value is equal to a candidate parameter value other than the first candidate parameter value among the C1 candidate parameter values. In one subsidiary embodiment of the above embodiment, the first state is pre-defined, and the first candidate parameter value is a pre-defined candidate parameter value among the C1 candidate parameter values. In one subsidiary embodiment of the above embodiment, the first state includes that the target sub-band supports or enables Flexible Link (FL) or Variable Link (VL). In one subsidiary embodiment of the above embodiment, the first state includes that the target sub-band supports or enables overriding of a link direction of time-domain symbols having been configured as an uplink or a downlink. In one subsidiary embodiment of the above embodiment, the first state includes that an identity or an index of the target sub-band is equal to a pre-defined value. In one subsidiary embodiment of the above embodiment, the first state includes that the target sub-band is configured by a BWP-configuring IE or signaling other than "BWP-DL" or "BWP-UL".

In one embodiment, the statement in the claims that "at least one of a relation between the target time-frequency resource set and the target sub-band or the configuration information of the target sub-band is used to determine the target parameter value out of the C1 candidate parameter values" includes the following meaning: the target time-frequency resource set belongs to the target sub-band in frequency domain; when the configuration information of the target sub-band explicitly or implicitly comprises the first state of the target sub-band, the target parameter value is equal to a first candidate parameter value among the C1 candidate parameter values; otherwise, the target parameter value is equal to a candidate parameter value other than the first candidate parameter value among the C1 candidate parameter values. In one subsidiary embodiment of the above embodiment, the first state is pre-defined, and the first candidate parameter value is a pre-defined candidate parameter value among the C1 candidate parameter values. In one subsidiary embodiment of the above embodiment, the first state includes that the target sub-band supports or enables Flexible Link (FL) or Variable Link (VL). In one subsidiary embodiment of the above embodiment, the first state includes that the target sub-band supports or enables overriding of a link direction of time-domain symbols having been configured as an uplink or a downlink. In one subsidiary embodiment of the above embodiment, the first state includes that an identity or an index of the target sub-band is equal to a pre-defined value. In one subsidiary embodiment of the above embodiment, the first state includes that the target sub-band is configured by a BWP-configuring IE or signaling other than "BWP-DL" or "BWP-UL".

In one embodiment, the statement in the claims that "at least one of a relation between the target time-frequency resource set and the target sub-band or the configuration information of the target sub-band is used to determine the target parameter value out of the C1 candidate parameter values" includes the following meaning: when there is at least one overlapped subcarrier between the target time-frequency resource set and the target sub-band in frequency domain, the target parameter value is equal to a first candidate parameter value among the C1 candidate parameter values; otherwise, the target parameter value is equal to a candidate parameter value other than the first candidate parameter value among the C1 candidate parameter values.

In one embodiment, a number of resource blocks comprised by the target time-frequency resource set in frequency domain is used to determine the target parameter value out of the C1 candidate parameter values.

Embodiment 2

Figure 2:
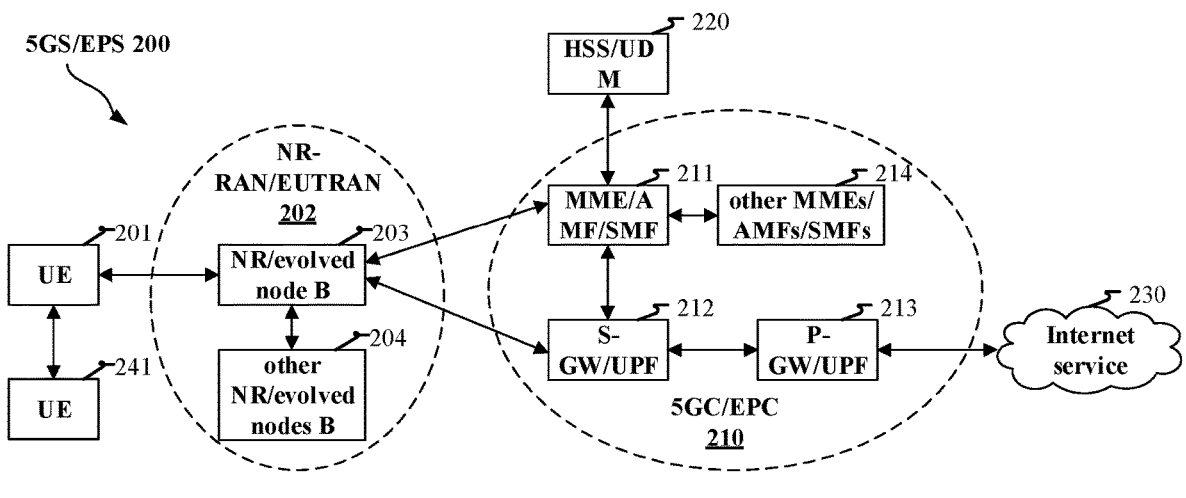
FIG. 2 illustrates a schematic diagram of a network architecture according to one embodiment of the present application.

Embodiment 2 illustrates a schematic diagram of a network architecture according to the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called 5G System/Evolved Packet System (5GS/EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR/evolved node B (gNB/eNB) 203 and other gNBs(eNBs) 204. The gNB(eNB) 203 provides UE 201 oriented user plane and control plane terminations. The gNB(eNB) 203 may be connected to other gNBs(eNBs) 204 via an Xn/X2 interface (for example, backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of UE 201 include cellular phones, smartphones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, test equipment, test instrument or test tools, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports Flexible Duplex transmission.

In one embodiment, the gNB(eNB) 203 corresponds to the second node in the present application.

In one embodiment, the gNB(eNB) 203 supports Flexible Duplex transmission.

Embodiment 3

Figure 3:
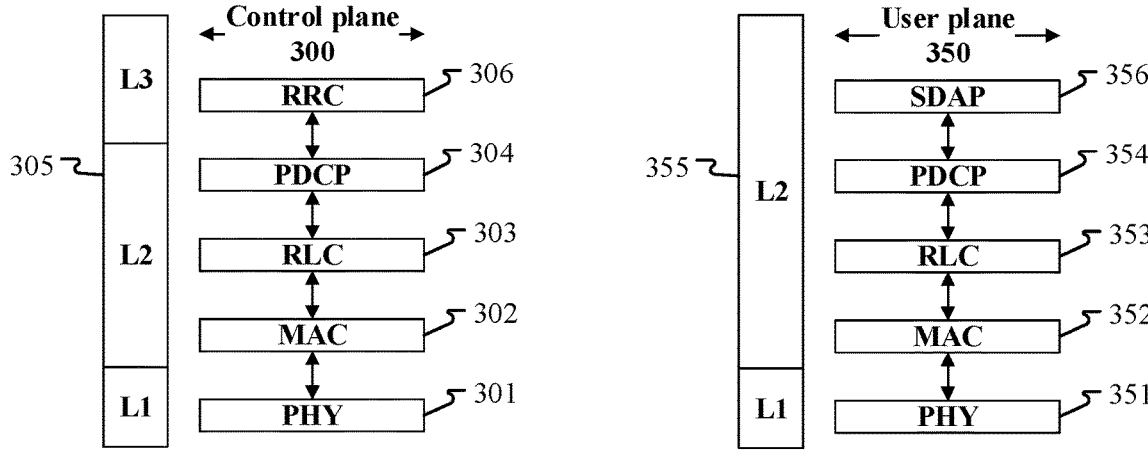
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 used for a first node (UE or gNB) and a second node (gNB or UE) is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first node and the second node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides multiplexing among variable radio bearers and logical channels. The PDCP sublayer 304 provides security by encrypting a packet and provides support for handover of a first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC306, or the MAC302, or the MAC352, or by the PHY301, or the PHY351.

In one embodiment, the first signaling in the present application is generated by the RRC306, or the MAC302, or the MAC352, or by the PHY301, or the PHY351.

In one embodiment, the target signal in the present application is generated by the RRC306, or the MAC302, or the MAC352, or by the PHY301, or the PHY351.

In one embodiment, the second information block in the present application is generated by the RRC306, or the MAC302, or the MAC352, or by the PHY301, or the PHY351.

In one embodiment, the third information block in the present application is generated by the RRC306, or the MAC302, or the MAC352, or by the PHY301, or the PHY351.

Embodiment 4

Figure 4:
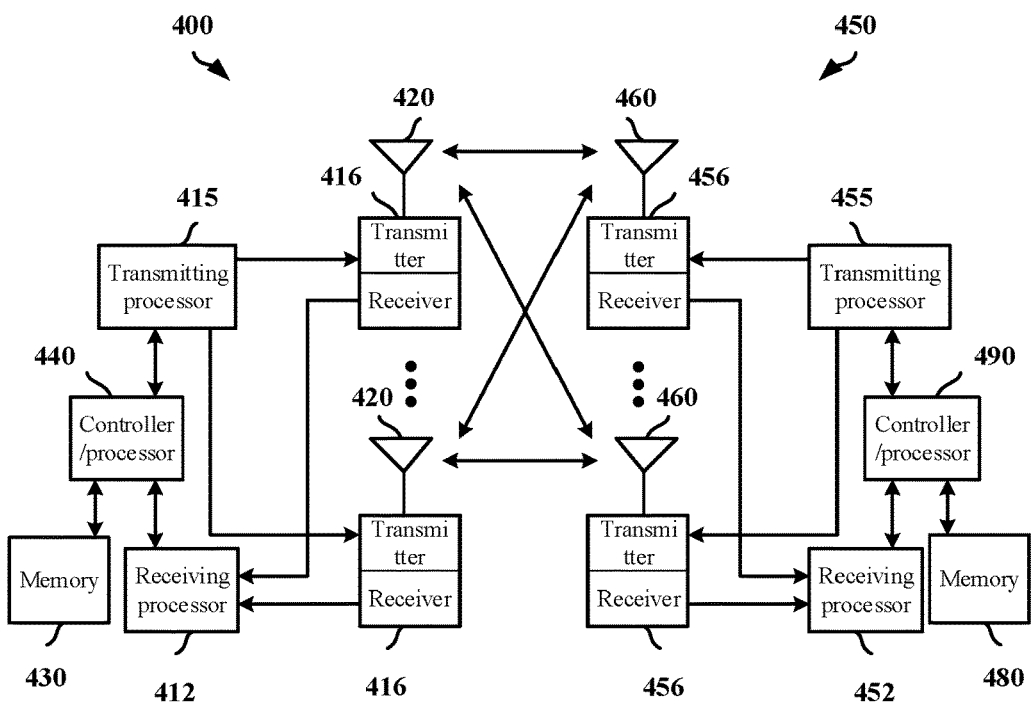
FIG. 4 illustrates a schematic diagram of a first node and a second node according to one embodiment of the present application.

Embodiment 4 illustrates a schematic diagram of a first node and a second node according to one embodiment of the present application, as shown in FIG. 4.

The first node (450) can comprise a controller/processor 490, a data source/buffer 480, a receiving processor 452, a transmitter/receiver 456 and a transmitting processor 455, where the transmitter/receiver 456 comprises an antenna 460.

The second node (410) can comprise a controller/processor 440, a data source/buffer 430, a receiving processor 412, a transmitter/receiver 416 and a transmitting processor 415, where the transmitter/receiver 416 comprises an antenna 420.

In Downlink (DL), a higher layer packet is provided to the controller/processor 440. The controller/processor 440 provides functions of the L2 layer and above. In DL, the controller/processor 440 provides header compression, encryption, packet segmentation and reordering, multiplexing between a logical channel and a transport channel as well as radio resources allocation for the first node 450 based on various priorities. The controller/processor 440 is responsible for HARQ operation, retransmission of a lost packet and a higher layer signaling to the first node 450. The first information block, second information block and third information block in the present application are generated by the controller/processor 440. The transmitting processor 415 performs various signal processing functions used for the L1 (that is, PHY), including coding, interleaving, scrambling, modulation, power control/allocation, pre-coding and physical layer control signaling generation, for example, the generation of a physical-layer signal carrying the first information block, a physical-layer signal carrying the second information block, a physical-layer signal carrying the third information block and the first signaling in the present application is completed in the transmitting processor 415. Modulation symbols that have been generated are divided into parallel streams and each of them is mapped onto a corresponding multicarrier subcarrier and/or multicarrier symbol, and then is mapped by the transmitting processor 415 to the antenna 420 via the transmitter 416 to be transmitted in the form of radio frequency signals. At the receiving end, each receiver 456 receives a radio frequency signal via a corresponding antenna 460, and recovers baseband information modulated onto a radio frequency carrier and provides the baseband information to the receiving processor 452. The receiving processor 452 performs various signal receiving processing functions used for the L1. Signal receiving processing functions include receiving a physical layer signal carrying the first information block, a physical layer signal carrying the second information block, a physical layer signal carrying the third information block and the first signaling in the present application, and demodulating multicarrier symbols in multicarrier symbol streams based on various modulation schemes (i.e., BPSK, QPSK), then de-scrambling, decoding and de-interleaving to recover data or control signal transmitted by the second node 410 on a physical channel, and providing the data and control signal to the controller/processor 490. The controller/processor 490 is in charge of the L2 and above layers, and the controller/processor 490 interprets higher-layer information in the present application. The interpretation includes the first information block, the second information block and the third information block. The controller/processor can be associated with the memory 480 that stores program code and data; the memory 480 may be called a computer readable medium.

In UL transmission, which is similar to DL, higher-layer information, including that carried in the target signal in the present application, upon generation in the controller/processor 490, is through the transmitting processor 455 to perform signal transmitting processing functions used for the L1 (that is, PHY), for instance, a physical layer signal of the target signal is mapped to the antenna 460 via the transmitter 456 from the transmitting processor 455 and transmitted in the form of radio frequency signal. The receiver 416 receives a radio frequency signal via a corresponding antenna 420, and each receiver 416 recovers baseband information modulated onto a radio frequency carrier and provides the baseband information to the receiving processor 412. The receiving processor 412 performs various signal reception processing functions used for L1 (i.e., PHY), including receiving a physical layer signal carrying the target signal in the present application and then providing data and/or control signal to the controller/processor 440. Functions of the L2 performed by the controller/processor 440 include interpreting higher-layer information, including higher-layer information carried in the target signal in the present application. The controller/processor can be associated with the buffer 430 that stores program code and data; the buffer 430 may be called a computer readable medium.

In one embodiment, the first node 450 comprises at least one processor and at least one memory, the at least one memory comprises computer program codes; The at least one memory and the computer program codes are configured to be used in collaboration with the at least one processor. The first node 450 at least receives a first information block and receives a first signaling, the first information block comprising configuration information of a target sub-band, the configuration information of the target sub-band being used to at least determine a slot format for the target sub-band, and the first signaling being used to determine a target time-frequency resource set, the target time-frequency resource set comprising at least one resource block in frequency domain and at least one time-domain symbol in time domain; and transmits a target signal with a target transmit (Tx) power in the target time-frequency resource set; herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

In one embodiment, the first node 450 comprises a memory that stores a computer readable instruction program, the computer readable instruction program generates actions when executed by at least one processor, which include: receiving a first information block and receiving a first signaling, the first information block comprising configuration information of a target sub-band, the configuration information of the target sub-band being used to at least determine a slot format for the target sub-band, and the first signaling being used to determine a target time-frequency resource set, the target time-frequency resource set comprising at least one resource block in frequency domain and at least one time-domain symbol in time domain; and transmitting a target signal with a target transmit (Tx) power in the target time-frequency resource set; herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

In one embodiment, the second device 410 comprises at least one processor and at least one memory, the at least one memory comprises computer program codes; the at least one memory and the computer program codes are configured to be used in collaboration with the at least one processor. The second device 410 at least: transmits a first information block and transmits a first signaling, the first information block comprising configuration information of a target sub-band, the configuration information of the target sub-band being used to at least configure a slot format for the target sub-band, and the first signaling being used to indicate a target time-frequency resource set, the target time-frequency resource set comprising at least one resource block in frequency domain and at least one time-domain symbol in time domain; and receives a target signal in the target time-frequency resource set, with a target transmit (Tx) power being equal to a transmit (Tx) power of the target signal; herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

In one embodiment, the second node 410 comprises a memory that stores a computer readable instruction program, the computer readable instruction program generates actions when executed by at least one processor, which include: transmitting a first information block and transmitting a first signaling, the first information block comprising configuration information of a target sub-band, the configuration information of the target sub-band being used to at least configure a slot format for the target sub-band, and the first signaling being used to indicate a target time-frequency resource set, the target time-frequency resource set comprising at least one resource block in frequency domain and at least one time-domain symbol in time domain; and receiving a target signal in the target time-frequency resource set, with a target transmit (Tx) power being equal to a transmit (Tx) power of the target signal; herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

In one embodiment, the first node 450 is a UE.

In one embodiment, the first node 450 is a UE supporting Flexible Duplex transmissions.

In one embodiment, the second node 410 is a base station (gNB/eNB).

In one embodiment, the second node 410 is a base station supporting Flexible Duplex transmissions.

In one embodiment, the receiver 456 (comprising the antenna 460), the receiving processor 452 and the controller/processor 490 are used for receiving the first information block in the present application.

In one embodiment, the receiver 456 (comprising the antenna 460) and the receiving processor 452 are used for receiving the first signaling in the present application.

In one embodiment, the transmitter 456 (comprising the antenna 460), the transmitting processor 455 and the controller/processor 490 are used for transmitting the target signal in the present application.

In one embodiment, the receiver 456 (comprising the antenna 460), the receiving processor 452 and the controller/processor 490 are used for receiving the second information block in the present application.

In one embodiment, the receiver 456 (comprising the antenna 460), the receiving processor 452 and the controller/processor 490 are used for receiving the third information block in the present application.

In one embodiment, the transmitter 416 (comprising the antenna 420), the transmitting processor 415 and the controller/processor 440 are used for transmitting the first information block in the present application.

In one embodiment, the transmitter 416 (comprising the antenna 420) and the transmitting processor 415 are used for transmitting the first signaling in the present application.

In one embodiment, the receiver 416 (comprising the antenna 420), the receiving processor 412 and the controller/processor 440 are used for receiving the target signal in the present application.

In one embodiment, the transmitter 416 (comprising the antenna 420), the transmitting processor 415 and the controller/processor 440 are used for transmitting the second information block in the present application.

In one embodiment, the transmitter 416 (comprising the antenna 420), the transmitting processor 415 and the controller/processor 440 are used for transmitting the third information block in the present application.

Embodiment 5

Figure 5:
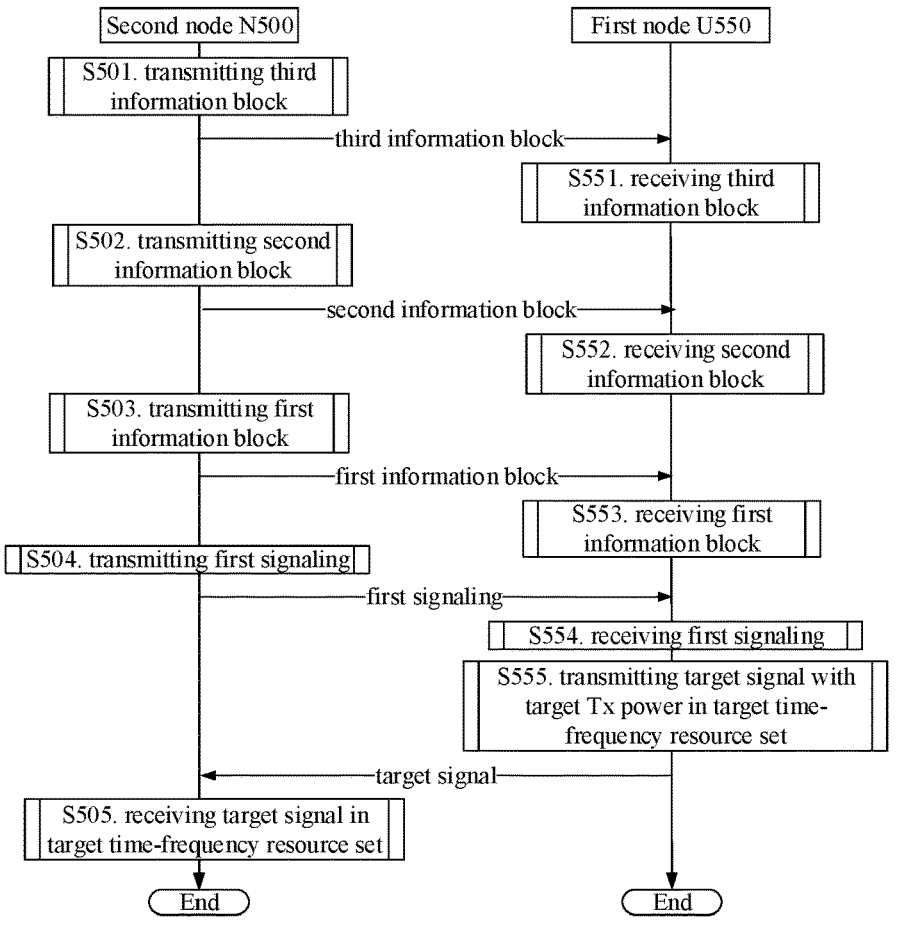
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, a second node N500 is a maintenance base station for a serving cell for a first node U550. It should be particularly noted that the sequence illustrated herein does not set any limit to the signal transmission order or implementation order in the present application.

The second node N500 transmits a third information block in step S501, and transmits a second information block in step S502, and transmits a first information block in step S503, and transmits a first signaling in step S504, and receives a target signal in a target time-frequency resource set in step S505;

the first node U550 receives a third information block in step S551, and receives a second information block in step S552, and receives a first information block in step S553, and receives a first signaling in step S554, and transmits a target signal with a target Tx power in a target time-frequency resource set in step S555.

In Embodiment 5, the first information block comprises configuration information of a target sub-band, the configuration information of the target sub-band being used to at least determine a slot format for the target sub-band, and the first signaling being used to determine a target time-frequency resource set, the target time-frequency resource set comprising at least one resource block in frequency domain and at least one time-domain symbol in time domain; and the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values; the second information block is used to determine a first time-domain symbol set corresponding to downlink and a second time-domain symbol set corresponding to uplink; the third information block is used to determine a reference power upper-bound value.

In one embodiment, the first information block is before the second information block.

In one embodiment, the first information block is after the second information block.

In one embodiment, the first information block is different from the second information block.

In one embodiment, the first information block and the second information block are transmitted through two different physical channels.

In one embodiment, the first information block and the second information block are transmitted through a same physical channel.

In one embodiment, the first information block and the second information block are two different fields or IEs comprised by a same signaling.

In one embodiment, the second information block comprises higher-layer information or higher-layer parameter configuration.

In one embodiment, the second information block comprises one or more Information Elements (IEs) comprised by a Radio Resource Control (RRC) layer signaling, or the second information block comprises one or more fields comprised by an RRC layer signaling.

In one embodiment, the second information block comprises part of or all fields comprised by a Master Information Block (MIB), or the second information block comprises part of or all fields comprised by a System Information Block (SIB).

In one embodiment, the second information block comprises part of or all fields comprised by a System Information Block 1 (SIB1).

In one embodiment, the second information block is UE specific or UE dedicated.

In one embodiment, the configuration of link directions comprised by the second information block is BandWidth Part-common (BWP-common).

In one embodiment, the configuration of link directions comprised by the second information block is Cross-BWP applicable.

In one embodiment, the second information block is Cell Common or Cell specific.

In one embodiment, the configuration of link directions comprised by the second information block is applicable to an entire band occupied by a serving cell to which the second information block belongs.

In one embodiment, the configuration of link directions comprised by the second information block is applicable to an entire carrier to which the second information block belongs.

In one embodiment, the second information block comprises physical layer control information or physical layer control parameters.

In one embodiment, the second information block comprises part of or all fields in a Downlink Control Information (DCI) Format.

In one embodiment, the second information block comprises part of or all fields in an IE "tdd-UL-DL-ConfigCommon".

In one embodiment, the second information block comprises part of or all fields in an IE "tdd-UL-DL-ConfigDedicated".

In one embodiment, the second information block comprises part of or all fields in DCI format 2_0.

In one embodiment, the statement in the claims that "the second information block is used to determine a first time-domain symbol set corresponding to downlink and a second time-domain symbol set corresponding to uplink" includes the following meaning: the second information block is used by the first node in the present application to determine the first time-domain symbol set corresponding to Downlink (DL) and the second time-domain symbol set corresponding to Uplink (UL).

In one embodiment, the statement in the claims that "the second information block is used to determine a first time-domain symbol set corresponding to downlink and a second time-domain symbol set corresponding to uplink" includes the following meaning: all or part comprised in the second information block is used for explicitly or implicitly indicating the first time-domain symbol set corresponding to Downlink (DL) and the second time-domain symbol set corresponding to Uplink (UL).

In one embodiment, the statement in the claims that "the second information block is used to determine a first time-domain symbol set corresponding to downlink and a second time-domain symbol set corresponding to uplink" includes the following meaning: the second information block is used for indicating the first time-domain symbol set and the second information block is used for indicating that the first time-domain symbol set corresponds to Downlink (DL); the second information block is used for indicating the second time-domain symbol set and the second information block is used for indicating that the second time-domain symbol set corresponds to Uplink (UL).

In one embodiment, the statement in the claims that "the second information block is used to determine a first time-domain symbol set corresponding to downlink and a second time-domain symbol set corresponding to uplink" includes the following meaning: the second information block is used for indicating a number of time-domain symbol(s) corresponding to Downlink (DL) and a number of time-domain symbol(s) corresponding to Uplink (UL) within a time window.

In one embodiment, the statement in the claims that "the second information block is used to determine a first time-domain symbol set corresponding to downlink and a second time-domain symbol set corresponding to uplink" includes the following meaning: the second information block is used for indicating a number X1 of time-domain symbol(s) corresponding to Downlink (DL) and a number X2 of time-domain symbol(s) corresponding to Uplink (UL) within a time window, where the first time-domain symbol set comprises the earliest X1 time-domain symbol(s) in a time window to which the first time-domain symbol set belongs, while the second time-domain symbol set comprises the latest X2 time-domain symbol(s) in a time window to which the second time-domain symbol set belongs.

In one embodiment, the statement in the claims that "the second information block is used to determine a first time-domain symbol set corresponding to downlink and a second time-domain symbol set corresponding to uplink" includes the following meaning: the second information block is used for indicating a number X1 of time-domain symbol(s) corresponding to Downlink (DL) and a number X2 of time-domain symbol(s) corresponding to Uplink (UL) within a time window, where the first time-domain symbol set comprises the latest X1 time-domain symbol(s) in a time window to which the first time-domain symbol set belongs, while the second time-domain symbol set comprises the earliest X2 time-domain symbol(s) in a time window to which the second time-domain symbol set belongs.

In one embodiment, the statement in the claims that "the second information block is used to determine a first time-domain symbol set corresponding to downlink and a second time-domain symbol set corresponding to uplink" includes the following meaning: the second information block is used to determine a Pattern 1 and a Pattern 2, the first time-domain symbol set comprising downlink time-domain symbols provided in the Pattern 1 and the Pattern 2, while the second time-domain symbol set comprising uplink time-domain symbols provided in the Pattern 1 and the Pattern 2.

In one embodiment, the second information block comprises a default configuration of link direction of the first time-domain symbol set, and the second information block comprises a default configuration of link direction of the second time-domain symbol set.

In one embodiment, the first information block is before the third information block.

In one embodiment, the first information block is after the third information block.

In one embodiment, the first information block and the third information block respectively carry two different SIBs.

In one embodiment, each of the first information block and the third information block is carried by means of a PDSCH.

In one embodiment, the first information block and the third information block are two different fields or IEs comprised by a same signaling.

In one embodiment, the third information block comprises higher-layer information or higher-layer parameter configuration.

In one embodiment, the third information block comprises one or more Information Elements (IEs) comprised by a Radio Resource Control (RRC) layer signaling, or the third information block comprises one or more fields comprised by an RRC layer signaling.

In one embodiment, the third information block comprises part of or all fields comprised by a System Information Block 1 (SIB1), or the third information block comprises all or part of IEs comprised by the SIB1.

In one embodiment, the third information block comprises part of or all fields comprised by a System Information Block 2 (SIB2), or the third information block comprises all or part of IEs comprised by the SIB2.

In one embodiment, the third information block is Cell Common or Cell specific.

In one embodiment, the third information block comprises physical layer control information or physical layer control parameters.

In one embodiment, the third information block comprises part of or all fields in an IE "NR-NS-PmaxList".

In one embodiment, the third information block comprises a field "additionalPmax" in an IE "NR-NS-PmaxList".

In one embodiment, the third information block comprises part of or all fields in an IE "p-Max".

In one embodiment, the statement that "the third information block is used to determine a reference power upper-bound value" in the claims includes a meaning that: the third information block is used by the first node in the present application to determine the reference power upper-bound value.

In one embodiment, the statement that "the third information block is used to determine a reference power upper-bound value" in the claims includes a meaning that: at least one field comprised by the third information block is used for explicitly or implicitly indicating the reference power upper-bound value.

Embodiment 6

Figure 6:
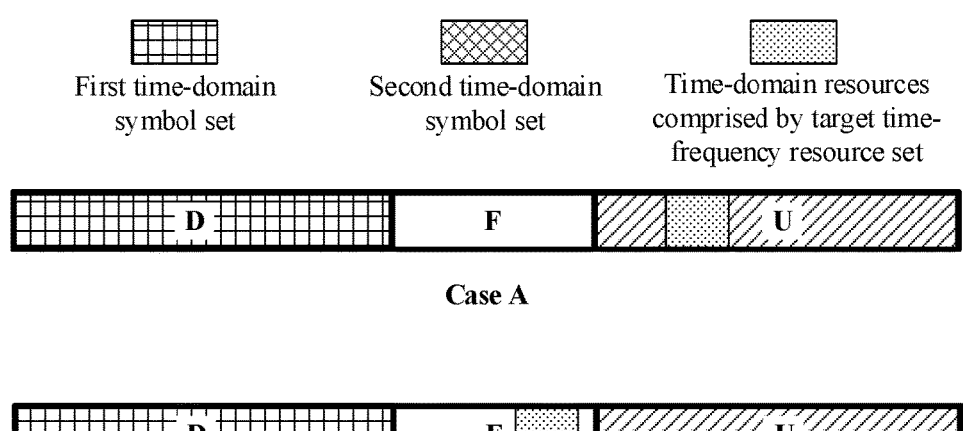
FIG. 6 illustrates a schematic diagram of a first time-domain symbol set and a second time-domain symbol set according to one embodiment of the present application.

Embodiment 6 illustrates a schematic diagram of a first time-domain symbol set and a second time-domain symbol set according to one embodiment of the present application, as shown in FIG. 6. In FIG. 6, as shown in Case A and Case B, the reticle-filled rectangle represents a first time-domain symbol set ("D" indicating a downlink), and the slash-filled rectangle represents a second time-domain symbol set ("U" indicating an uplink), and the blank rectangle represents at least one time-domain symbol with Flexible (F) Link; the dot-filled rectangle represents time-domain resources comprised by a target time-frequency resource set; in Case A, any time-domain symbol comprised by the target time-frequency resource set in time domain belongs to a second time-domain symbol set; in Case B, the target time-frequency resource set comprises a time-domain symbol in time domain that does not belong to the second time-domain symbol set.

In Embodiment 6, the second information block in the present application is used to determine a first time-domain symbol set corresponding to downlink and a second time-domain symbol set corresponding to uplink; whether the target time-frequency resource set in the present application comprises at least one time-domain symbol belonging to the first time-domain symbol set in time domain is used to determine the target parameter value in the present application out of the C1 candidate parameter values in the present application, or, whether any time-domain symbol comprised by the target time-frequency resource set in time domain belongs to the second time-domain symbol set is used to determine the target parameter value out of the C1 candidate parameter values.

In one embodiment, the first time-domain symbol set comprises at least one time-domain symbol, or the first time-domain symbol set is an empty set.

In one embodiment, the second time-domain symbol set comprises at least one time-domain symbol, or the second time-domain symbol set is an empty set.

In one embodiment, the first time-domain symbol set comprises at least one time-domain symbol, and the second time-domain symbol set comprises at least one time-domain symbol; the first time-domain symbol set and the second time-domain symbol set are orthogonal.

In one embodiment, time-domain symbols comprised by the first time-domain symbol set occupy consecutive time-domain resources.

In one embodiment, time-domain symbols comprised by the second time-domain symbol set occupy consecutive time-domain resources.

In one embodiment, time-domain symbols comprised by the first time-domain symbol set occupy discrete time-domain resources.

In one embodiment, time-domain symbols comprised by the second time-domain symbol set occupy discrete time-domain resources.

In one embodiment, the phrase that the first time-domain symbol set corresponds to a Downlink (DL) means that: any time-domain symbol comprised by the first time-domain symbol set can only be used for downlink transmission.

In one embodiment, the phrase that the first time-domain symbol set corresponds to a Downlink (DL) means that: any time-domain symbol comprised by the first time-domain symbol set is a downlink (DL) symbol.

In one embodiment, the phrase that the first time-domain symbol set corresponds to a Downlink (DL) means that: a link direction of any time-domain symbol comprised by the first time-domain symbol set cannot be overridden by other configurations.

In one embodiment, the phrase that the first time-domain symbol set corresponds to a Downlink (DL) means that: any time-domain symbol comprised by the first time-domain symbol set can only be used for downlink transmission at least on the target sub-band.

In one embodiment, the phrase that the first time-domain symbol set corresponds to a Downlink (DL) means that: a link direction that the second information block configures to be associated with or corresponding to the first time-domain symbol set is a Downlink (DL), and other configurations can override the link direction configured by the second information block on the target sub-band.

In one embodiment, the phrase that the first time-domain symbol set corresponds to a Downlink (DL) means that: a link direction that the second information block configures to be associated with or corresponding to the first time-domain symbol set is a Downlink (DL), and configurations other than the second information block are used to finally determine whether a time-domain symbol comprised by the first time-domain symbol set can only be used for downlink transmission on the target sub-band.

In one embodiment, the phrase that the first time-domain symbol set corresponds to a Downlink (DL) means that: any time-domain symbol comprised by the first time-domain symbol set can only be used for downlink transmission on an entire carrier or serving cell to which the target sub-band belongs.

In one embodiment, the phrase that the first time-domain symbol set corresponds to a Downlink (DL) means that: any time-domain symbol comprised by the first time-domain symbol set could be used for downlink transmission or could be used for uplink transmission on frequency-domain resources other than the target sub-band.

In one embodiment, the phrase that the first time-domain symbol set corresponds to a Downlink (DL) means that: any time-domain symbol comprised by the first time-domain symbol set could be used for downlink transmission on at least one sub-band other than the target sub-band.

In one embodiment, the phrase that the first time-domain symbol set corresponds to a Downlink (DL) means that: any time-domain symbol comprised by the first time-domain symbol set is used for downlink transmission on an Initial BWP or a Default BWP.

In one embodiment, the phrase that the first time-domain symbol set corresponds to a Downlink (DL) means that: for a UE of a previous release (e.g., R15, R16 or R17), any time-domain symbol comprised by the first time-domain symbol set can only be used for downlink transmission; for a UE of a new release (e.g., R18 or R19), a time-domain symbol comprised by the first time-domain symbol set could be used for downlink transmission or could be used for uplink transmission.

In one embodiment, the phrase that the first time-domain symbol set corresponds to a Downlink (DL) means that: a link direction that the second information block configures to be associated with or corresponding to the first time-domain symbol set is a Downlink (DL).

In one embodiment, the phrase that the first time-domain symbol set corresponds to a Downlink (DL) means that: a Downlink (DL) is a candidate link direction of at least one time-domain symbol comprised by the first time-domain symbol set.

In one embodiment, the phrase that the second time-domain symbol set corresponds to an Uplink (UL) means that: any time-domain symbol comprised by the second time-domain symbol set can only be used for uplink transmission.

In one embodiment, the phrase that the second time-domain symbol set corresponds to an Uplink (UL) means that: any time-domain symbol comprised by the second time-domain symbol set is an Uplink (UL) symbol.

In one embodiment, the phrase that the second time-domain symbol set corresponds to an Uplink (UL) means that: a link direction of any time-domain symbol comprised by the second time-domain symbol set cannot be overridden by other configurations.

In one embodiment, the phrase that the second time-domain symbol set corresponds to an Uplink (UL) means that: any time-domain symbol comprised by the second time-domain symbol set can only be used for uplink transmission on the target sub-band.

In one embodiment, the phrase that the second time-domain symbol set corresponds to an Uplink (UL) means that: a link direction that the second information block configures to be associated with or corresponding to the second time-domain symbol set is an Uplink (UL), and other configurations can override the link direction configured by the second information block on the target sub-band.

In one embodiment, the phrase that the second time-domain symbol set corresponds to a Downlink (DL) means that: a link direction that the second information block configures to be associated with or corresponding to the second time-domain symbol set is an Uplink (UL), and configurations other than the second information block are used to finally determine whether a time-domain symbol comprised by the second time-domain symbol set can only be used for uplink transmission on the target sub-band.

In one embodiment, the phrase that the second time-domain symbol set corresponds to an Uplink (UL) means that: any time-domain symbol comprised by the second time-domain symbol set can only be used for uplink transmission on an entire carrier or serving cell to which the target sub-band belongs.

In one embodiment, the phrase that the second time-domain symbol set corresponds to an Uplink (UL) means that: any time-domain symbol comprised by the second time-domain symbol set could be used for downlink transmission or could be used for uplink transmission on frequency-domain resources other than the target sub-band.

In one embodiment, the phrase that the second time-domain symbol set corresponds to an Uplink (UL) means that: any time-domain symbol comprised by the second time-domain symbol set could be used for uplink transmission on at least one sub-band other than the target sub-band.

In one embodiment, the phrase that the second time-domain symbol set corresponds to an Uplink (UL) means that: any time-domain symbol comprised by the second time-domain symbol set is used for uplink transmission on an Initial BWP or a Default BWP.

In one embodiment, the phrase that the second time-domain symbol set corresponds to an Uplink (UL) means that: for a UE of a previous release (e.g., R15, R16 or R17), any time-domain symbol comprised by the second time-domain symbol set can only be used for uplink transmission; for a UE of a new release (e.g., R18 or R19), a time-domain symbol comprised by the second time-domain symbol set could be used for downlink transmission or could be used for uplink transmission.

In one embodiment, the phrase that the second time-domain symbol set corresponds to an Uplink (UL) means that: a link direction that the second information block configures to be associated with or corresponding to the second time-domain symbol set is an Uplink (UL).

In one embodiment, the phrase that the second time-domain symbol set corresponds to an Uplink (UL) means that: an Uplink (UL) is a candidate link direction of at least one time-domain symbol comprised by the second time-domain symbol set.

In one embodiment, the statement that "whether the target time-frequency resource set comprises at least one time-domain symbol belonging to the first time-domain symbol set in time domain is used to determine the target parameter value out of the C1 candidate parameter values" in the claims includes the following meaning: whether the target time-frequency resource set comprises at least one time-domain symbol in time domain belonging to the first time-domain symbol set is used by the first node in the present application to determine the target parameter value out of the C1 candidate parameter values.

In one embodiment, the statement that "whether the target time-frequency resource set comprises at least one time-domain symbol belonging to the first time-domain symbol set in time domain is used to determine the target parameter value out of the C1 candidate parameter values" in the claims includes the following meaning: when the target time-frequency resource set comprises at least one time-domain symbol in time domain belonging to the first time-domain symbol set, the target parameter value is equal to a pre-defined candidate parameter value among the C1 candidate parameter values; otherwise, at least one of a relation between the target time-frequency resource set and the target sub-band or the configuration information of the target sub-band is used to determine the target parameter value out of the C1 candidate parameter values.

In one embodiment, the statement that "whether the target time-frequency resource set comprises at least one time-domain symbol belonging to the first time-domain symbol set in time domain is used to determine the target parameter value out of the C1 candidate parameter values" in the claims includes the following meaning: when the target time-frequency resource set comprises at least one time-domain symbol in time domain belonging to the first time-domain symbol set, a position of the target time-frequency resource set in the target sub-band is used to determine the target parameter value out of the C1 candidate parameter values; otherwise, the target parameter value is equal to a pre-defined candidate parameter value among the C1 candidate parameter values.

In one embodiment, the statement that "whether the target time-frequency resource set comprises at least one time-domain symbol belonging to the first time-domain symbol set in time domain is used to determine the target parameter value out of the C1 candidate parameter values" in the claims includes the following meaning: when the target time-frequency resource set comprises at least one time-domain symbol in time domain belonging to the first time-domain symbol set, at least one of a relation between the target time-frequency resource set and the target sub-band or the configuration information of the target sub-band is used to determine the target parameter value out of the C1 candidate parameter values; otherwise, the target parameter value is equal to a pre-defined candidate parameter value among the C1 candidate parameter values.

In one embodiment, the statement that "whether any time-domain symbol comprised by the target time-frequency resource set in time domain belongs to the second time-domain symbol set is used to determine the target parameter value out of the C1 candidate parameter values" in the claims includes the following meaning: whether any time-domain symbol comprised by the target time-frequency resource set in time domain belongs to the second time-domain symbol set is used by the first node in the present application to determine the target parameter value out of the C1 candidate parameter values.

In one embodiment, the statement that "whether any time-domain symbol comprised by the target time-frequency resource set in time domain belongs to the second time-domain symbol set is used to determine the target parameter value out of the C1 candidate parameter values" in the claims includes the following meaning: when any time-domain symbol comprised by the target time-frequency resource set in time domain belongs to the second time-domain symbol set, the target parameter value is equal to a pre-defined candidate parameter value among the C1 candidate parameter values; otherwise, at least one of a relation between the target time-frequency resource set and the target sub-band or the configuration information of the target sub-band is used to determine the target parameter value out of the C1 candidate parameter values.

In one embodiment, the statement that "whether any time-domain symbol comprised by the target time-frequency resource set in time domain belongs to the second time-domain symbol set is used to determine the target parameter value out of the C1 candidate parameter values" in the claims includes the following meaning: when any time-domain symbol comprised by the target time-frequency resource set in time domain belongs to the second time-domain symbol set, at least one of a relation between the target time-frequency resource set and the target sub-band or the configuration information of the target sub-band is used to determine the target parameter value out of the C1 candidate parameter values; otherwise, the target parameter value is equal to a pre-defined candidate parameter value among the C1 candidate parameter values.

In one embodiment, the statement that "whether any time-domain symbol comprised by the target time-frequency resource set in time domain belongs to the second time-domain symbol set is used to determine the target parameter value out of the C1 candidate parameter values" in the claims includes the following meaning: when any time-domain symbol comprised by the target time-frequency resource set in time domain belongs to the second time-domain symbol set, the target parameter value is equal to a first candidate parameter value among the C1 candidate parameter values; when a time-domain symbol comprised by the target time-frequency resource set in time domain does not belong to the second time-domain symbol set, and there is at least one overlapping subcarrier between the target time-frequency resource set and the target sub-band, the target parameter value is equal to a candidate parameter value other than the first candidate parameter value among the C1 candidate parameter values; when a time-domain symbol comprised by the target time-frequency resource set in time domain does not belong to the second time-domain symbol set, and the target time-frequency resource set is orthogonal with the target sub-band, the target parameter value is equal to the first candidate parameter value.

In one embodiment, the statement that "whether any time-domain symbol comprised by the target time-frequency resource set in time domain belongs to the second time-domain symbol set is used to determine the target parameter value out of the C1 candidate parameter values" in the claims includes the following meaning: when any time-domain symbol comprised by the target time-frequency resource set in time domain belongs to the second time-domain symbol set, the target parameter value is equal to a first candidate parameter value among the C1 candidate parameter values; when a time-domain symbol comprised by the target time-frequency resource set in time domain does not belong to the second time-domain symbol set, and there is at least one overlapping subcarrier between the target sub-band and an Initial BWP or a Default BWP, the target parameter value is equal to the first candidate parameter value; when a time-domain symbol comprised by the target time-frequency resource set in time domain does not belong to the second time-domain symbol set, and the target sub-band is orthogonal with an Initial BWP or a Default BWP, the target parameter value is equal to a candidate parameter value other than the first candidate parameter value among the C1 candidate parameter values.

Embodiment 7

Figure 7:
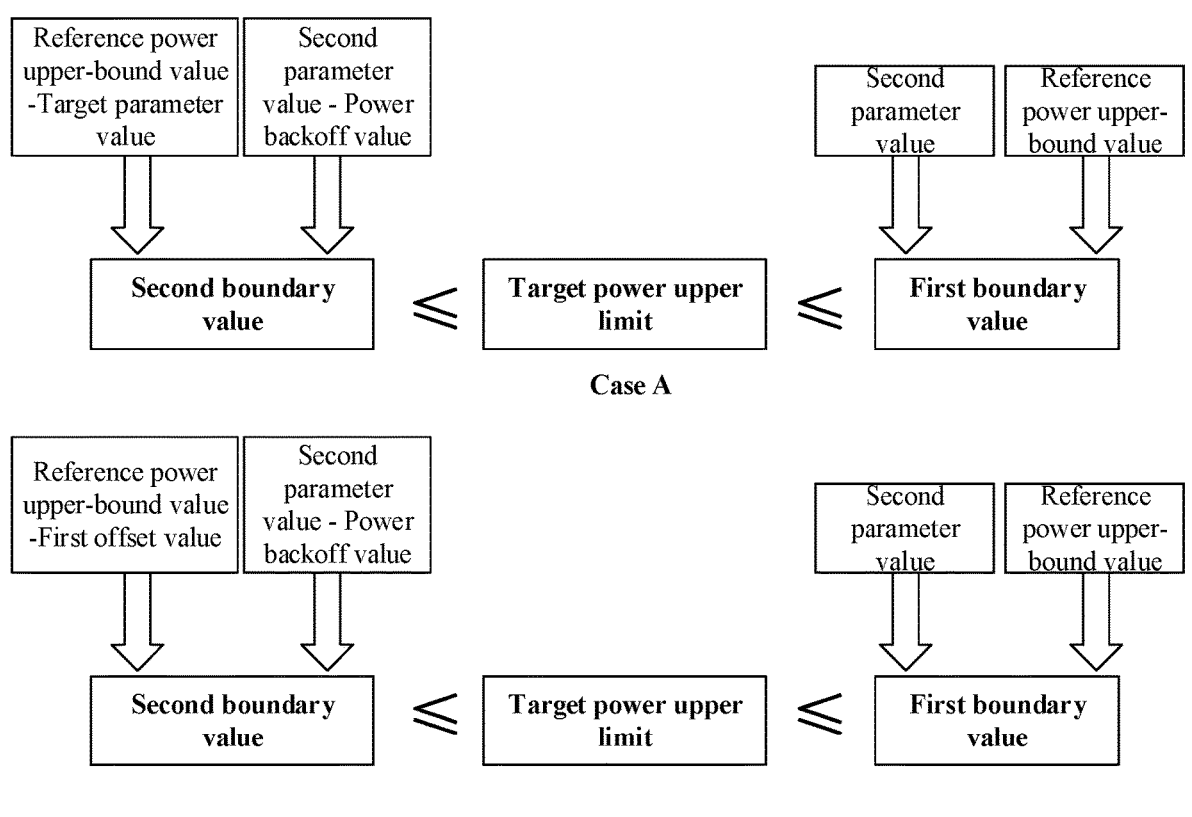
FIG. 7 illustrates a schematic diagram of a first boundary value and a second boundary value according to one embodiment of the present application.

Embodiment 7 illustrates a schematic diagram of a first boundary value and a second boundary value according to one embodiment of the present application, as shown in FIG. 7. In FIG. 7, each rectangular box represents a variable value or a parameter value, with the arrowhead indicating a relationship of determination.

In Embodiment 7, the third information block in the present application is used to determine a reference power upper-bound value; a first boundary value is equal to a maximum boundary value of the value range of the target power upper limit in the present application, and a second boundary value is equal to a minimum boundary value of the value range of the target power upper limit; the second parameter value in the present application and the reference power upper-bound value are used together to determine the first boundary value; the second boundary value is equal to a smaller value between a difference of the reference power upper-bound value and the target parameter value in the present application and a difference of the second parameter value and a power backoff value, or the second boundary value is equal to a smaller value between a difference of the reference power upper-bound value and a first offset value and a difference of the second parameter value and the power backoff value; the target parameter value is used to determine the power backoff value, and a position of resource blocks comprised by the target time-frequency resource set in the present application in frequency domain in a band to which the target time-frequency resource set belongs is used to determine the first offset value.

In one embodiment, the reference power upper-bound value is $P_{EMAX,c}$.

In one embodiment, the reference power upper-bound value is measured in dBm.

In one embodiment, the reference power upper-bound value is an upper-bound value of a transmit power in a serving cell set by the network.

In one embodiment, the reference power upper-bound value is an integer.

In one embodiment, the reference power upper-bound value is equal to an integer between −30 through 33.

In one embodiment, the first boundary value is equal to a maximum value that can be reached by the target power upper limit.

In one embodiment, the first boundary value is equal to a maximum value in a value range of the target power upper limit.

In one embodiment, the second boundary value is equal to a minimum value that can be reached by the target power upper limit.

In one embodiment, the second boundary value is equal to a minimum value in a value range of the target power upper limit.

In one embodiment, the statement that "the second parameter value and the reference power upper-bound value are used together to determine the first boundary value" in the claims includes the following meaning: the second parameter value and the reference power upper-bound value are used together by the first node in the present application to determine the first boundary value.

In one embodiment, the statement that "the second parameter value and the reference power upper-bound value are used together to determine the first boundary value" in the claims includes the following meaning: the second parameter value and the reference power upper-bound value are used together to calculate the first boundary value.

In one embodiment, the statement that "the second parameter value and the reference power upper-bound value are used together to determine the first boundary value" in the claims includes the following meaning: the first boundary value $P_{CMAX\_H,f,c}$ satisfies $$P_{CMAX\_H,f,c}=\text{MIN}\{P_{EMAX,c}, P_{PowerClass}-\Delta_{PowerClass}\}$$

where $P_{EMAX,c}$ represents the reference power upper-bound value, and $P_{PowerClass}$ represents the second parameter value, and $\Delta P_{PowerClass}$ represents a power offset value.

In one embodiment, the statement that "the second parameter value and the reference power upper-bound value are used together to determine the first boundary value" in the claims includes the following meaning: the first boundary value $P_{CMAX\_H,f,c}$ satisfies $$P_{CMAX\_H,f,c}=\text{MIN}\{P_{EMAX,c}, P_{PowerClass}-\Delta_{PowerClass}-\Delta_{Flexible\_signal}\}$$

where $P_{EMAX,c}$ represents the reference power upper-bound value, and $P_{PowerClass}$ represents the second parameter value, and $\Delta P_{PowerClass}$ represents a power offset value, and $\Delta_{Flexible\_signal}$ represents the target parameter.

In one embodiment, the statement in the claims that "the target parameter value is used to determine the power backoff value" includes a meaning that: the target parameter value is used by the first node in the present application to determine the power backoff value.

In one embodiment, the statement in the claims that "the target parameter value is used to determine the power backoff value" includes a meaning that: the target parameter value is used for calculating the power backoff value.

In one embodiment, the statement in the claims that "the target parameter value is used to determine the power backoff value" includes a meaning that: the power backoff value $P_{backoff}$ satisfies $$P_{backoff}=\text{MAX}(\text{MAX}(MPR_c+\Delta MPR_c, A\text{-}MPR_c)+\Delta T_{IB,c}+\Delta T_{C,c}+\Delta_{Flexible\_signal}+\Delta T_{RxSRS}, \text{P-}MPR_c)$$

$\Delta_{Flexible\_signal}$ represents the target parameter, and $MPR_c$ represents an MPR value, and $A\text{-}MPR_c$ represents an A-MPR value, and $\Delta MPR_c$, represents an MPR offset value, and $\text{P-}MPR_c$ represents a P-MPR value, and $\Delta T_{IB,c}$ represents a tolerance value, and $\Delta T_{C,c}$ is an offset value related to a frequency-domain position of a transmission bandwidth in a channel bandwidth, and $\Delta T_{RxSRS}$ represents an SRS-related offset value.

In one embodiment, the statement in the claims that "the target parameter value is used to determine the power backoff value" includes a meaning that: the power backoff value $P_{backoff}$ satisfies $$P_{backoff}=\text{MAX}(\text{MAX}(MPR_c+\Delta MPR_c, A\text{-}MPR_c)+\Delta T_{IB,c}+\Delta T_{C,c}+\Delta T_{RxSRS}, \text{P-}MPR_c)$$

$$\Delta T_{C,c}=\Delta T_{Flex,C,c}+\Delta_{Flexible\_signal}$$

herein, $\Delta_{Flexible\_signal}$ represents the target parameter, and $MPR_c$ represents an MPR value, and $A\text{-}MPR_c$ represents an A-MPR value, and $\Delta MPR_c$, represents an MPR offset value, and $\text{P-}MPR_c$ represents a P-MPR value, and $\Delta T_{IB,c}$ represents a tolerance value, and $\Delta T_{Flex,C,c}$ represents an offset value related to a frequency-domain position of a transmission bandwidth in a channel bandwidth, and $\Delta T_{RxSRS}$ represents an SRS-related offset value.

In one embodiment, the statement in the claims that "the target parameter value is used to determine the power backoff value" includes a meaning that: the power backoff value $P_{backoff}$ satisfies $$P_{backoff}=\text{MAX}(\text{MAX}(MPR_c+\Delta MPR_c, A\text{-}MPR_c+\Delta_{Flexible\_signal})+\Delta T_{IB,c}+\Delta T_{C,c}+\Delta T_{RxSRS}, \text{P-}MPR_c)$$

where $\Delta_{Flexible\_signal}$ represents the target parameter, and $MPR_c$ represents an MPR value, and $A\text{-}MPR_c$ represents an A-MPR value, and $\Delta MPR_c$, represents an MPR offset value, and $\text{P-}MPR_c$ represents a P-MPR value, and $\Delta T_{IB,c}$ represents a tolerance value, and $\Delta T_{C,c}$ represents an offset value related to a frequency-domain position of a transmission bandwidth in a channel bandwidth, and $\Delta T_{RxSRS}$ represents an SRS-related offset value.

In one embodiment, the statement in the claims that "the target parameter value is used to determine the power backoff value" includes a meaning that: the power backoff value $P_{backoff}$ satisfies $$P_{backoff}=\text{MAX}(\text{MAX}(MPR_c+\Delta MPR_c, A\text{-}MPR_c)+\Delta T_{IB,c}+\Delta T_{C,c}+\Delta T_{RxSRS}, \text{P-}MPR_c)$$

$$A\text{-}MPR_c=A\text{-}MPR_{Flex,c}+\Delta_{Flexible\_signal}$$

where $\Delta_{Flexible\_signal}$ represents the target parameter, and $MPR_c$ represents an MPR value, and $A\text{-}MPR_c$ represents an A-MPR value, and $A\text{-}MPR_{Flex,c}$ represents an A-MPR value of previous releases (including R15, R16 and R17), and $\Delta MPR_c$, represents an MPR offset value, and $\text{P-}MPR_c$ represents a P-MPR value, and $\Delta T_{IB,c}$ represents a tolerance value, and $\Delta T_{C,c}$ represents an offset value related to a frequency-domain position of a transmission bandwidth in a channel bandwidth, and $\Delta T_{RxSRS}$ represents an SRS-related offset value.

In one embodiment, the statement in the claims that "the target parameter value is used to determine the power backoff value" includes a meaning that: the power backoff value $P_{backoff}$ satisfies $$P_{backoff} = \text{MAX}(\text{MAX}(\text{MPR}_c + \Delta\text{MPR}_c, \text{A-MPR}_c) + \Delta T_{IB,c} + \Delta T_{C,c} + \Delta T_{RxSRS}, \text{P-MPR}_c)$$

$$\Delta\text{MPR}_c = \Delta\text{MPR}_{Flex,c} + \Delta_{Flexible\_signal}$$

where $\Delta_{Flexible\_signal}$ represents the target parameter, and $\text{MPR}_c$ represents an MPR value, and $\text{A-MPR}_c$ represents an A-MPR value, and $\Delta\text{MPR}_c$ represents an MPR offset value, and $\Delta\text{MPR}_{Flex,c}$ represents an MPR offset value of previous releases, and $\text{P-MPR}_c$ represents a P-MPR value, and $\Delta T_{IB,c}$ represents a tolerance value, and $\Delta T_{C,c}$ represents an offset value related to a frequency-domain position of a transmission bandwidth in a channel bandwidth, and $\Delta T_{RxSRS}$ represents an SRS-related offset value.

In one embodiment, the first offset value is $\Delta T_{C,c}$.

In one embodiment, the target parameter value is used to determine the first offset value.

In one embodiment, the statement that "a position of resource blocks comprised by the target time-frequency resource set in frequency domain in a band to which the target time-frequency resource set belongs is used to determine the first offset value" in the claims includes the following meaning: the position of resource blocks comprised by the target time-frequency resource set in frequency domain in a band to which the target time-frequency resource set belongs is used by the first node in the present application to determine the first offset value.

In one embodiment, the statement that "a position of resource blocks comprised by the target time-frequency resource set in frequency domain in a band to which the target time-frequency resource set belongs is used to determine the first offset value" in the claims includes the following meaning: the position of resource blocks comprised by the target time-frequency resource set in frequency domain in a channel bandwidth to which the target time-frequency resource set belongs is used by the first node in the present application to determine the first offset value.

In one embodiment, the statement that "a position of resource blocks comprised by the target time-frequency resource set in frequency domain in a band to which the target time-frequency resource set belongs is used to determine the first offset value" in the claims includes the following meaning: when the target time-frequency resource set comprises at least one resource block in frequency domain with a frequency separation from an upper boundary or a lower boundary of a band to which the target time-frequency resource set belongs being no greater than 4 MHz, the first offset value is equal to a pre-defined value greater than 0; otherwise, the first offset value is equal to 0.

In one embodiment, the statement that "a position of resource blocks comprised by the target time-frequency resource set in frequency domain in a band to which the target time-frequency resource set belongs is used to determine the first offset value" in the claims includes the following meaning: when there is a frequency gap no greater than 4 MHz between any resource block comprised by the target time-frequency resource set in frequency domain and each of a highest boundary and a lowest boundary of a band to which the target time-frequency resource set belongs, the first offset value is equal to a pre-defined value greater than 0; otherwise, the first offset value is equal to 0.

In one embodiment, a position of resource blocks comprised by the target time-frequency resource set in frequency domain in a band to which the target time-frequency resource set belongs is used to determine the target parameter value.

Embodiment 8

Embodiment 8 illustrates a schematic diagram of a first frequency interval and a second frequency interval according to one embodiment of the present application, as shown in FIG. 8. In FIG. 8, the vertical axis represents frequency, and the thick-line framed rectangle with no filling represents a target sub-band, and the reticle-filled rectangle represents a first frequency interval, and the cross-filled rectangle represents a second frequency interval.

In Embodiment 8, a first boundary frequency is equal to a lowest boundary frequency of the target sub-band in the present application, while a second boundary frequency is equal to a highest boundary frequency of the target sub-band; a first reference frequency is equal to a sum of the first boundary frequency and a target frequency gap length, while a second reference frequency is equal to a difference between the second boundary frequency and the target frequency gap length; a first frequency interval is a frequency interval ranging from the first boundary frequency to the first reference frequency, while a second frequency interval is a frequency interval ranging from the second reference frequency to the second boundary frequency; a locational relation between the target time-frequency resource set and the first frequency interval or the second frequency interval in frequency domain is used to determine the target parameter value in the present application out of the C1 candidate parameter values in the present application.

In one embodiment, a relation between the target time-frequency resource set and the target sub-band includes a locational relation between the target time-frequency resource set and the first frequency interval or the second frequency interval in frequency domain.

In one embodiment, the first boundary frequency is a lowest frequency point of the target sub-band.

In one embodiment, the first boundary frequency is a lowest frequency that can be comprised by the target sub-band.

In one embodiment, the second boundary frequency is a highest frequency point of the target sub-band.

In one embodiment, the second boundary frequency is a highest frequency that can be comprised by the target sub-band.

In one embodiment, a difference between the second boundary frequency and the first boundary frequency is equal to a bandwidth of the target sub-band.

In one embodiment, the target frequency gap length is greater than 0.

In one embodiment, the target frequency gap length is equal to 4 MHz.

In one embodiment, the target frequency gap length is equal to 8 MHz.

In one embodiment, the target frequency gap length is pre-defined.

In one embodiment, the target frequency gap length is explicitly or implicitly configured.

In one embodiment, a locational relation between the target time-frequency resource set and the first frequency interval or the second frequency interval in frequency domain includes: whether the target time-frequency resource set comprises at least one subcarrier in frequency domain belonging to one of the first frequency interval or the second frequency interval.

In one embodiment, a locational relation between the target time-frequency resource set and the first frequency interval or the second frequency interval in frequency domain includes: whether the target time-frequency resource set is orthogonal with any of the first frequency interval or the second frequency interval in frequency domain.

In one embodiment, a locational relation between the target time-frequency resource set and the first frequency interval or the second frequency interval in frequency domain includes: whether the target time-frequency resource set is confined within the first frequency interval or the second frequency interval in frequency domain.

In one embodiment, a locational relation between the target time-frequency resource set and the first frequency interval or the second frequency interval in frequency domain includes: whether the first frequency interval or the second frequency interval comprises any resource block comprised by the target time-frequency resource set in frequency domain.

In one embodiment, a locational relation between the target time-frequency resource set and the first frequency interval or the second frequency interval in frequency domain includes: whether any resource block comprised by the target time-frequency resource set in frequency domain is comprised in the first frequency interval or the second frequency interval.

In one embodiment, a locational relation between the target time-frequency resource set and the first frequency interval or the second frequency interval in frequency domain includes: whether any frequency point comprised by the target time-frequency resource set in frequency domain belongs to the first frequency interval or the second frequency interval.

In one embodiment, the statement that "a locational relation between the target time-frequency resource set and the first frequency interval or the second frequency interval in frequency domain is used to determine the target parameter value out of the C1 candidate parameter values" in the claims includes the following meaning: a locational relation between the target time-frequency resource set and the first frequency interval or the second frequency interval in frequency domain is used by the first node in the present application to determine the target parameter value out of the C1 candidate parameter values.

In one embodiment, the statement that "a locational relation between the target time-frequency resource set and the first frequency interval or the second frequency interval in frequency domain is used to determine the target parameter value out of the C1 candidate parameter values" in the claims includes the following meaning: when the target time-frequency resource set is confined within the first frequency interval or the second frequency interval in frequency domain, configuration information of the target sub-band is used to determine the target parameter value out of the C1 candidate parameter values; otherwise, the target parameter value is equal to a pre-defined candidate parameter value among the C1 candidate parameter values.

In one embodiment, the statement that "a locational relation between the target time-frequency resource set and the first frequency interval or the second frequency interval in frequency domain is used to determine the target parameter value out of the C1 candidate parameter values" in the claims includes the following meaning: when exist overlapping frequency-domain resources between the target time-frequency resource set and the first frequency interval or the second frequency interval in frequency domain, configuration information of the target sub-band is used to determine the target parameter value out of the C1 candidate parameter values; otherwise, the target parameter value is equal to a pre-defined candidate parameter value among the C1 candidate parameter values.

In one embodiment, the statement that "a locational relation between the target time-frequency resource set and the first frequency interval or the second frequency interval in frequency domain is used to determine the target parameter value out of the C1 candidate parameter values" in the claims includes the following meaning: when one of the first frequency interval or the second frequency interval comprises all frequency-domain resources comprised by the target time-frequency resource set in frequency domain, configuration information of the target sub-band is used to determine the target parameter value out of the C1 candidate parameter values; otherwise, the target parameter value is equal to a pre-defined candidate parameter value among the C1 candidate parameter values.

In one embodiment, the statement that "a locational relation between the target time-frequency resource set and the first frequency interval or the second frequency interval in frequency domain is used to determine the target parameter value out of the C1 candidate parameter values" in the claims includes the following meaning: when the target time-frequency resource set is orthogonal with each of the first frequency interval and the second frequency interval in frequency domain, the target parameter value is equal to a pre-defined candidate parameter value among the C1 candidate parameter values; otherwise, the configuration information of the target sub-band is used to determine the target parameter value out of the C1 candidate parameter values.

Embodiment 9

Embodiment 9 illustrates a schematic diagram of configuration information of a target sub-band according to one embodiment of the present application, as shown in FIG. 9. In FIG. 9, the thick-line framed rectangle represents all configuration information of the target sub-band, and each thin-line framed rectangle represents a part of the configuration information of the target sub-band.

In Embodiment 9, the configuration information of the target sub-band in the present application comprises at least one of location information of the target sub-band in frequency domain or a link direction indicator of the target sub-band; the link direction indicator of the target sub-band is used to determine the slot format for the target sub-band.

In one embodiment, location information of the target sub-band in frequency domain includes an identity or an index of the target sub-band.

In one embodiment, location information of the target sub-band in frequency domain includes index(es) of at least one PRB comprised by the target sub-band.

In one embodiment, location information of the target sub-band in frequency domain includes index(es) of at least one subcarrier comprised by the target sub-band.

In one embodiment, location information of the target sub-band in frequency domain includes a center frequency of the target sub-band.

In one embodiment, location information of the target sub-band in frequency domain includes a frequency of a carrier to which the target sub-band belongs.

In one embodiment, location information of the target sub-band in frequency domain includes a number of a band to which the target sub-band belongs.

In one embodiment, location information of the target sub-band in frequency domain includes a Frequency Range (FR) to which the target sub-band belongs.

In one embodiment, location information of the target sub-band in frequency domain includes an ID of a BWP to which the target sub-band belongs.

In one embodiment, location information of the target sub-band in frequency domain includes ID(s) of at least one BWP comprised by the target sub-band.

In one embodiment, location information of the target sub-band in frequency domain includes ID(s) of at least one BWP overlapping with at least one subcarrier in the target sub-band.

In one embodiment, location information of the target sub-band in frequency domain includes whether there is at least one overlapping subcarrier between the target sub-band and a reference BWP. In one subsidiary embodiment of the above embodiment, the reference BWP is an Initial BWP. In one subsidiary embodiment of the above embodiment, the reference BWP is a Default BWP. In one subsidiary embodiment of the above embodiment, the reference BWP is an Initial BWP configured by a MIB. In one subsidiary embodiment of the above embodiment, the reference BWP is an Initial BWP configured by a SIB. In one subsidiary embodiment of the above embodiment, the reference BWP is pre-defined or the reference BWP is configured explicitly or implicitly by signaling.

In one embodiment, location information of the target sub-band in frequency domain includes whether each sub-carrier comprised by the target sub-band is located in the neighborhood of a center frequency of a carrier or a band to which the target sub-band belongs.

In one embodiment, location information of the target sub-band in frequency domain includes whether there is at least one subcarrier among subcarriers comprised by the target sub-band being located in the neighborhood of boundaries of a carrier or a band to which the target sub-band belongs.

In one embodiment, location information of the target sub-band in frequency domain includes whether the target sub-band is confined within a pre-defined range of boundaries of a band to which the target sub-band belongs.

In one embodiment, location information of the target sub-band in frequency domain includes whether the target sub-band comprises a frequency point located within a pre-defined range of boundaries of a band to which the target sub-band belongs.

In one embodiment, the link direction indicator of the target sub-band is equal to a value of a field comprised by the first information block.

In one embodiment, the link direction indicator of the target sub-band is equal to a value of an IE comprised by the first information block.

In one embodiment, the link direction indicator of the target sub-band is equal to a value of a Boolean parameter.

In one embodiment, the link direction indicator of the target sub-band is equal to a value of a Flag parameter.

In one embodiment, the link direction indicator of the target sub-band is a state of switching.

In one embodiment, the link direction indicator of the target sub-band is equal to a value of partial bits in a field comprised by the first information block.

In one embodiment, the statement in the claims that "the configuration information of the target sub-band comprises at least one of location information of the target sub-band in frequency domain or a link direction indicator of the target sub-band" includes the following meaning: the configuration information of the target sub-band comprises location information of the target sub-band in frequency domain and a link direction indicator of the target sub-band.

In one embodiment, the statement in the claims that "the configuration information of the target sub-band comprises at least one of location information of the target sub-band in frequency domain or a link direction indicator of the target sub-band" includes the following meaning: the configuration information of the target sub-band comprises only the location information of the target sub-band in frequency domain of location information of the target sub-band in frequency domain or a link direction indicator of the target sub-band.

In one embodiment, the statement in the claims that "the configuration information of the target sub-band comprises at least one of location information of the target sub-band in frequency domain or a link direction indicator of the target sub-band" includes the following meaning: the configuration information of the target sub-band comprises only the link direction indicator of the target sub-band of location information of the target sub-band in frequency domain or a link direction indicator of the target sub-band.

In one embodiment, the statement in the claims that "the link direction indicator of the target sub-band is used to determine the slot format for the target sub-band" includes the following meaning: the link direction indicator of the target sub-band is used for explicitly or implicitly indicating whether the target sub-band is a sub-band with Flexible or Variable Link.

In one embodiment, the statement in the claims that "the link direction indicator of the target sub-band is used to determine the slot format for the target sub-band" includes the following meaning: the link direction indicator of the target sub-band is used for explicitly or implicitly indicating whether the target sub-band supports a link direction of time-domain symbols configured as an uplink or a downlink by an IE "tdd-UL-DL-ConfigCommon" in being overridden.

In one embodiment, the statement in the claims that "the link direction indicator of the target sub-band is used to determine the slot format for the target sub-band" includes the following meaning: the link direction indicator of the target sub-band is used for explicitly or implicitly indicating whether the target sub-band supports a link direction of time-domain symbols configured as an uplink or a downlink by an IE "tdd-UL-DL-ConfigDedicated" in being overridden.

In one embodiment, the statement in the claims that "the link direction indicator of the target sub-band is used to determine the slot format for the target sub-band" includes the following meaning: the link direction indicator of the target sub-band is used for explicitly or implicitly indicating whether the target sub-band supports multiple link directions.

In one embodiment, the statement in the claims that "the link direction indicator of the target sub-band is used to determine the slot format for the target sub-band" includes the following meaning: when the link direction indicator of the target sub-band is a pre-defined state, a first configuration set is used to determine the slot format for the target sub-band; otherwise, a second configuration set is used to determine the slot format for the target sub-band; the first configuration set is different from the second configuration set. In one subsidiary embodiment of the above embodiment, the first configuration set comprises at least one configuration signaling (or field or IE) or configuration parameter, and the second configuration set comprises at least one configuration signaling or configuration parameter.

In one subsidiary embodiment of the above embodiment, the first configuration set comprises the second configuration set, and the first configuration set comprises one configuration signaling or configuration parameter other than the second configuration set. In one subsidiary embodiment of the above embodiment, the second configuration set comprises the first configuration set, and the second configuration set comprises one configuration signaling or configuration parameter other than the first configuration set. In one subsidiary embodiment of the above embodiment, there is at least one configuration signaling or configuration parameter only belonging to the first configuration set or the second configuration set. In one subsidiary embodiment of the above embodiment, there is at least one configuration signaling or configuration parameter belonging to both the first configuration set and the second configuration set.

In one embodiment, the statement in the claims that "the link direction indicator of the target sub-band is used to determine the slot format for the target sub-band" includes the following meaning: the link direction indicator of the target sub-band is used by the first node in the present application to determine the slot format for the target sub-band.

In one embodiment, the statement in the claims that "the link direction indicator of the target sub-band is used to determine the slot format for the target sub-band" includes the following meaning: the link direction indicator of the target sub-band is used for directly or indirectly determining the slot format for the target sub-band.

Embodiment 10

Embodiment 10 illustrates a schematic diagram of M1 candidate slot formats according to one embodiment of the present application, as shown in FIG. 10. In FIG. 10, each thick-line framed rectangle represents one of M1 candidate slot formats, and each reticle-filled rectangle represents at least one Downlink (D) time-domain symbol, and each cross-filled rectangle represents at least one Uplink (U) time-domain symbol, and each blank rectangle represents at least one Flexible (F) time-domain symbol.

In Embodiment 10, any slot format for the target sub-band in the present application is one of M1 candidate slot formats, M1 being a positive integer greater than 1; among the M1 candidate slot formats there exists at least one candidate slot format in which an uplink time-domain symbol is earlier than a downlink time-domain symbol.

In one embodiment, any candidate slot format among the M1 candidate slot formats comprises a distribution pattern of uplink and downlink time-domain symbols in a pre-defined or configurable time window.

In one embodiment, any candidate slot format among the M1 candidate slot formats comprises numbers of uplink and downlink time-domain symbols in a pre-defined or configurable time window.

In one embodiment, any candidate slot format among the M1 candidate slot formats comprises numbers of and a distribution pattern of uplink and downlink time-domain symbols in a pre-defined or configurable time window.

In one embodiment, any candidate slot format among the M1 candidate slot formats comprises a distribution pattern of uplink and downlink time-domain symbols and flexible time-domain symbols in a pre-defined or configurable time window.

In one embodiment, there is a candidate slot format comprised among the M1 candidate slot formats that comprises a pre-defined or configurable time window in which all time-domain symbols comprised are downlink time-domain symbols.

In one embodiment, there is a candidate slot format comprised among the M1 candidate slot formats that comprises a pre-defined or configurable time window in which all time-domain symbols comprised are uplink time-domain symbols.

In one embodiment, there is a candidate slot format comprised among the M1 candidate slot formats that comprises a pre-defined or configurable time window in which part of time-domain symbols comprised are downlink time-domain symbols.

In one embodiment, there is a candidate slot format comprised among the M1 candidate slot formats that comprises a pre-defined or configurable time window in which part of time-domain symbols comprised are uplink time-domain symbols.

In one embodiment, there is a candidate slot format comprised among the M1 candidate slot formats that comprises a pre-defined or configurable time window in which all time-domain symbols comprised are flexible time-domain symbols.

In one embodiment, any two candidate slot formats among the M1 candidate slot formats are different.

In one embodiment, any two candidate slot formats among the M1 candidate slot formats are different in at least one of a number of downlink time-domain symbols comprised, a number of uplink time-domain symbols comprised or a sequential order of downlink time-domain symbols and uplink time-domain symbols comprised respectively in a pre-defined or configurable time window.

In one embodiment, any two candidate slot formats among the M1 candidate slot formats are different in at least one of a number of downlink time-domain symbols comprised, a number of uplink time-domain symbols comprised or distribution of uplink and downlink time-domain symbols comprised respectively in a pre-defined or configurable time window.

In one embodiment, the M1 candidate slot formats are pre-defined.

In one embodiment, the M1 candidate slot formats are explicitly or implicitly configured.

In one embodiment, the link direction indicator of the target sub-band in the present application is used to determine the M1 candidate slot formats.

In one embodiment, whether the first node in the present application supports the capability of Flexible or Variable Duplex is used to determine the M1 candidate slot formats.

In one embodiment, whether the first node in the present application supports the capability of Flexible or Variable Link is used to determine the M1 candidate slot formats.

In one embodiment, capabilities of the first node in the present application are used to determine the M1 candidate slot formats.

In one embodiment, capabilities of the first node in the present application and explicit or implicit configuration are used together to determine the M1 candidate slot formats.

In one embodiment, the statement in the claims that "among the M1 candidate slot formats there exists at least one candidate slot format in which an uplink time-domain symbol is earlier than a downlink time-domain symbol" includes the following meaning: among the M1 candidate slot formats there exists at least one candidate slot format in which an uplink time-domain symbol is earlier than a downlink time-domain symbol in a target time window, the target time window being pre-defined or configurable. In one subsidiary embodiment of the above embodiment, the target time window is a slot. In one subsidiary embodiment of the above embodiment, the target time window comprises at least one slot. In one subsidiary embodiment of the above embodiment, the target time window is two frames in a row. In one subsidiary embodiment of the above embodiment, the target time window comprises multiple consecutive time-domain symbols. In one subsidiary embodiment of the above embodiment, the target time window is a configuration period.

In one embodiment, there is only one candidate slot format among the M1 candidate slot formats in which uplink time-domain symbols comprised are earlier than downlink time-domain symbols comprised in a pre-defined or configurable time window.

In one embodiment, there are multiple candidate slot formats among the M1 candidate slot formats in which uplink time-domain symbols comprised are earlier than downlink time-domain symbols comprised in a pre-defined or configurable time window.

In one embodiment, there is at least one candidate slot format among the M1 candidate slot formats in which any uplink time-domain symbol comprised is earlier than any downlink time-domain symbol comprised in a pre-defined or configurable time window.

In one embodiment, there is at least one candidate slot format among the M1 candidate slot formats in which an uplink time-domain symbol comprised is earlier than a downlink time-domain symbol comprised in a pre-defined or configurable time window.

In one embodiment, there is at least one candidate slot format among the M1 candidate slot formats in which uplink time-domain symbols comprised are distributed before downlink time-domain symbols comprised in a pre-defined or configurable time window.

In one embodiment, there is at least one candidate slot format among the M1 candidate slot formats in which uplink time-domain symbols comprised in a pre-defined or configurable time window are the earliest positive integer number of symbols while downlink time-domain symbols comprised in a pre-defined or configurable time window are the latest positive integer number of symbols.

In one embodiment, there is at least one candidate slot format among the M1 candidate slot formats in which an uplink time-domain symbol comprised is earlier than a downlink time-domain symbol comprised and an uplink time-domain symbol is later than a downlink time-domain symbol in a pre-defined or configurable time window.

Embodiment 11

Embodiment 11 illustrates a schematic diagram illustrating a relation between a first Tx power and a target parameter value according to one embodiment of the present application, as shown in FIG. 11. In FIG. 11, the two rectangular boxes respectively represent a first Tx power and a target parameter value, with the arrowhead indicating a linearly correlated relationship.

In Embodiment 11, the first Tx power in the present application is measured in dBm, and the first Tx power is linear with the target parameter value in the present application, and the number of resource blocks comprised by the target time-frequency resource set in the present application in frequency domain is used to determine the target parameter value out of the C1 candidate parameter values.

In one embodiment, a correlation coefficient of linear correlation between the first Tx power and the target parameter value is greater than 0.

In one embodiment, a correlation coefficient of linear correlation between the first Tx power and the target parameter value is equal to 1.

In one embodiment, a correlation coefficient of linear correlation between the first Tx power and the target parameter value is equal to 10.

In one embodiment, a correlation coefficient of linear correlation between the first Tx power and the target parameter value is less than 0.

In one embodiment, a correlation coefficient of linear correlation between the first Tx power and the target parameter value is equal to −1.

In one embodiment, a correlation coefficient of linear correlation between the first Tx power and the target parameter value is equal to −10.

In one embodiment, the statement that "a number of resource blocks comprised by the target time-frequency resource set in frequency domain is used to determine the target parameter value out of the C1 candidate parameter values" in the claims includes the following meaning: the number of resource blocks comprised by the target time-frequency resource set in frequency domain is used by the first node in the present application to determine the target parameter value out of the C1 candidate parameter values.

In one embodiment, the statement that "a number of resource blocks comprised by the target time-frequency resource set in frequency domain is used to determine the target parameter value out of the C1 candidate parameter values" in the claims includes the following meaning: the number of resource blocks comprised by the target time-frequency resource set in frequency domain is used to calculate the target parameter value, and the number of resource blocks comprised by the target time-frequency resource set in frequency domain is one of C1 candidate numbers, the C1 candidate numbers being respectively calculated for obtaining the C1 candidate parameter values.

In one embodiment, the statement that "a number of resource blocks comprised by the target time-frequency resource set in frequency domain is used to determine the target parameter value out of the C1 candidate parameter values" in the claims includes the following meaning: the number of resource blocks comprised by the target time-frequency resource set in frequency domain is used to calculate the target parameter value, and the number of resource blocks comprised by the target time-frequency resource set in frequency domain is one of C2 candidate numbers, the C2 candidate numbers being respectively calculated for obtaining the C1 candidate parameter values, where C2 is a positive integer no greater than C1.

In one embodiment, the statement that "a number of resource blocks comprised by the target time-frequency resource set in frequency domain is used to determine the target parameter value out of the C1 candidate parameter values" in the claims includes the following meaning: a logarithmic value of the number of resource blocks comprised by the target time-frequency resource set in frequency domain is used to determine the target parameter value out of the C1 candidate parameter values.

In one embodiment, the statement that "a number of resource blocks comprised by the target time-frequency resource set in frequency domain is used to determine the target parameter value out of the C1 candidate parameter values" in the claims includes the following meaning: a logarithmic value of a bandwidth of the target time-frequency resource set in frequency domain is used to determine the target parameter value out of the C1 candidate parameter values.

In one embodiment, the statement that "a number of resource blocks comprised by the target time-frequency resource set in frequency domain is used to determine the target parameter value out of the C1 candidate parameter values" in the claims includes the following meaning: a logarithmic value of an absolute number of frequency-domain resources occupied by the target time-frequency resource set in frequency domain is used to determine the target parameter value out of the C1 candidate parameter values.

In one embodiment, the statement that "a number of resource blocks comprised by the target time-frequency resource set in frequency domain is used to determine the target parameter value out of the C1 candidate parameter values" in the claims includes the following meaning: a logarithmic value of an absolute number of frequency-domain resources occupied by the target time-frequency resource set in frequency domain is used to determine the target parameter value out of the C1 candidate parameter values.

In one embodiment, the statement that "a number of resource blocks comprised by the target time-frequency resource set in frequency domain is used to determine the target parameter value out of the C1 candidate parameter values" in the claims includes the following meaning: the C1 candidate parameter values are all possible values of the target parameter value, and the number of resource blocks comprised by the target time-frequency resource set in frequency domain is used for calculating the target parameter value.

In one embodiment, the first Tx power $P_{temp\_signal,b,f,c}$ satisfies:

$$P_{temp\_signal,b,f,c} = P_{O\_signal,b,f,c} + 10 \log_{10}(2^{\mu} \cdot M_{RB,b,f,c} + \alpha_{b,f,c} \cdot PL_{b,f,c} + \varphi_{b,f,c} + \Delta_{Flexible\_signal}$$

where $P_{O\_signal,b,f,c}$ represents a configured P0 value, and $\Delta_{Flexible\_signal}$ represents the target parameter, and $10 \log_{10}(2^{\mu} \cdot M_{RB,b,f,c})$ represents the first parameter, and $\alpha_{b,f,c}$ represents a pathloss factor, and $PL_{b,f,c}$ represents a pathloss, and $\varphi_{b,f,c}$ represents other pre-defined or configurable parameter; the signal represents the target signal, and b represents a Bandwidth Part (BWP) to which the target signal belongs, and f represents a carrier to which the target signal belongs infrequency domain, and c represents a serving cell to which the target signal belongs.

In one embodiment, the first information block is used to determine a subcarrier spacing (SCS) of subcarriers occupied by the target signal in frequency domain.

In one embodiment, a subcarrier spacing (SCS) of subcarriers occupied by the target signal in frequency domain is also used to determine the target parameter value out of the C1 candidate parameter values.

Embodiment 12

Figure 12:
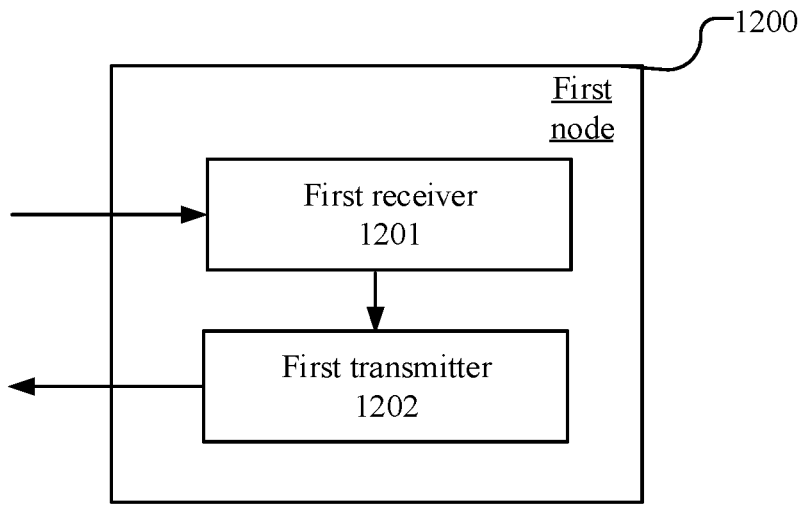
FIG. 12 illustrates a structure block diagram of a processing device in a first node according to one embodiment of the present application.

Embodiment 12 illustrates a structure block diagram of a processing device in a first node in an example, as shown in FIG. 12. In FIG. 12, a processing device 1200 in a first node is comprised of a first receiver 1201 and a first transmitter 1202. The first receiver 1201 comprises the transmitter/receiver 456 (comprising the antenna 460), the receiving processor 452 and the controller/processor 490 in FIG. 4 of the present application; the first transmitter 1202 comprises the transmitter/receiver 456 (comprising the antenna 460), the transmitting processor 455 and the controller/processor 490 in FIG. 4 of the present application.

In Embodiment 12, the first receiver 1201 receives a first information block and receives a first signaling, the first information block comprising configuration information of a target sub-band, the configuration information of the target sub-band being used to at least determine a slot format for the target sub-band, and the first signaling being used to determine a target time-frequency resource set, the target time-frequency resource set comprising at least one resource block in frequency domain and at least one time-domain symbol in time domain; and the first transmitter 1202 transmits a target signal with a target transmit (Tx) power in the target time-frequency resource set; herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

In one embodiment, the first receiver 1201 receives a second information block; herein, the second information block is used to determine a first time-domain symbol set corresponding to a downlink direction and a second time-domain symbol set corresponding to an uplink direction; whether the target time-frequency resource set comprises at least one time-domain symbol belonging to the first time-domain symbol set in time domain is used to determine the target parameter value out of the C1 candidate parameter values, or, whether any time-domain symbol comprised by the target time-frequency resource set in time domain belongs to the second time-domain symbol set is used to determine the target parameter value out of the C1 candidate parameter values.

In one embodiment, the first receiver 1201 receives a third information block; herein, the third information block is used to determine a reference power upper-bound value; a first boundary value is equal to an upper boundary value of the value range of the target power upper limit, and a second boundary value is equal to a lower boundary value of the value range of the target power upper limit; the second parameter value and the reference power upper-bound value are used together to determine the first boundary value; the second boundary value is equal to a smaller value between a difference of the reference power upper-bound value and the target parameter value and a difference of the second parameter value and a power backoff value, or the second boundary value is equal to a smaller value between a difference of the reference power upper-bound value and a first offset value and a difference of the second parameter value and the power backoff value; the target parameter value is used to determine the power backoff value, and a position of resource blocks comprised by the target time-frequency resource set in frequency domain in a band to which the target time-frequency resource set belongs is used to determine the first offset value.

In one embodiment, a first boundary frequency is equal to a lowest boundary frequency of the target sub-band, while a second boundary frequency is equal to a highest boundary frequency of the target sub-band; a first reference frequency is equal to a sum of the first boundary frequency and a target frequency gap length, while a second reference frequency is equal to a difference between the second boundary frequency and the target frequency gap length; a first frequency interval is a frequency interval ranging from the first boundary frequency to the first reference frequency, while a second frequency interval is a frequency interval ranging from the second reference frequency to the second boundary frequency; a locational relation between the target time-frequency resource set and the first frequency interval or the second frequency interval in frequency domain is used to determine the target parameter value out of the C1 candidate parameter values.

In one embodiment, configuration information of the target sub-band comprises at least one of location information of the target sub-band in frequency domain or a link direction indicator of the target sub-band; the link direction indicator of the target sub-band is used to determine the slot format for the target sub-band.

In one embodiment, any slot format for the target sub-band is one of M1 candidate slot formats, M1 being a positive integer greater than 1; among the M1 candidate slot formats there exists at least one candidate slot format in which an uplink time-domain symbol is earlier than a downlink time-domain symbol.

In one embodiment, the first Tx power is measured in dBm, and the first Tx power is linear with the target parameter value, and the number of resource block(s) comprised by the target time-frequency resource set infrequency domain is used to determine the target parameter value out of the C1 candidate parameter values.

Embodiment 13

Figure 13:
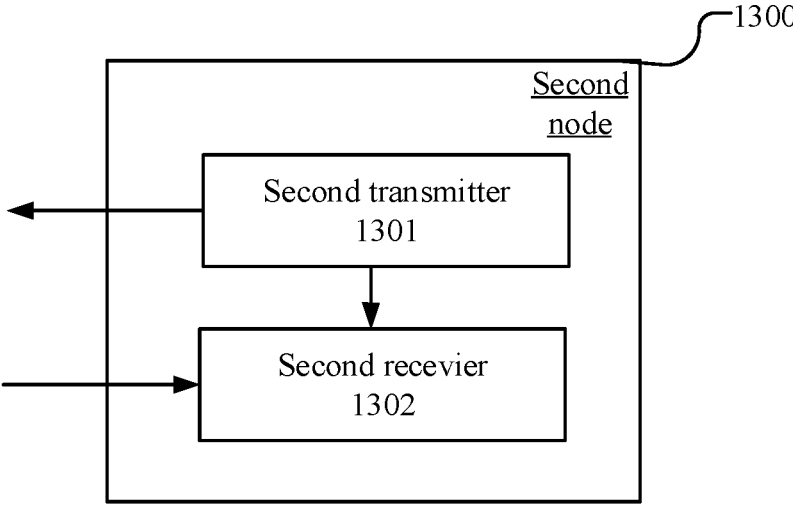
FIG. 13 illustrates a structure block diagram a processing device in a second node according to one embodiment of the present application.

Embodiment 13 illustrates a structure block diagram of a processing device in a second node in an example, as shown in FIG. 13. In FIG. 13, a processing device 1300 in a second node is comprised of a second transmitter 1301 and a second receiver 1302. The second transmitter 1301 comprises the transmitter/receiver 416 (comprising the antenna 460), the transmitting processor 415 and the controller/processor 440 in FIG. 4 of the present application; the second receiver 1302 comprises the transmitter/receiver 416 (comprising the antenna 460), the receiving processor 412, the transmitting processor 415 and the controller/processor 440 in FIG. 4 of the present application.

In Embodiment 13, the second transmitter 1301 transmits a first information block and transmits a first signaling, the first information block comprising configuration information of a target sub-band, the configuration information of the target sub-band being used to at least configure a slot format for the target sub-band, and the first signaling being used to indicate a target time-frequency resource set, the target time-frequency resource set comprising at least one resource block in frequency domain and at least one time-domain symbol in time domain; and the second receiver 1302 receives a target signal in the target time-frequency resource set, with a target transmit (Tx) power being equal to a transmit (Tx) power of the target signal; herein, the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

In one embodiment, the second transmitter 1301 transmits a second information block; herein, the second information block is used to indicate a first time-domain symbol set corresponding to a downlink direction and a second time-domain symbol set corresponding to an uplink direction; whether the target time-frequency resource set comprises at least one time-domain symbol belonging to the first time-domain symbol set in time domain is used to determine the target parameter value out of the C1 candidate parameter values, or, whether any time-domain symbol comprised by the target time-frequency resource set in time domain belongs to the second time-domain symbol set is used to determine the target parameter value out of the C1 candidate parameter values.

In one embodiment, the second transmitter 1301 transmits a third information block; herein, the third information block is used to indicate a reference power upper-bound value; a first boundary value is equal to an upper boundary value of the value range of the target power upper limit, and a second boundary value is equal to a lower boundary value of the value range of the target power upper limit; the second parameter value and the reference power upper-bound value are used together to determine the first boundary value; the second boundary value is equal to a smaller value between a difference of the reference power upper-bound value and the target parameter value and a difference of the second parameter value and a power backoff value, or the second boundary value is equal to a smaller value between a difference of the reference power upper-bound value and a first offset value and a difference of the second parameter value and the power backoff value; the target parameter value is used to determine the power backoff value, and a position of resource blocks comprised by the target time-frequency resource set in frequency domain in a band to which the target time-frequency resource set belongs is used to determine the first offset value.

In one embodiment, a first boundary frequency is equal to a lowest boundary frequency of the target sub-band, while a second boundary frequency is equal to a highest boundary frequency of the target sub-band; a first reference frequency is equal to a sum of the first boundary frequency and a target frequency gap length, while a second reference frequency is equal to a difference between the second boundary frequency and the target frequency gap length; a first frequency interval is a frequency interval ranging from the first boundary frequency to the first reference frequency, while a second frequency interval is a frequency interval ranging from the second reference frequency to the second boundary frequency; a locational relation between the target time-frequency resource set and the first frequency interval or the second frequency interval in frequency domain is used to determine the target parameter value out of the C1 candidate parameter values.

In one embodiment, configuration information of the target sub-band comprises at least one of location information of the target sub-band in frequency domain or a link direction indicator of the target sub-band; the link direction indicator of the target sub-band is used to determine the slot format for the target sub-band.

In one embodiment, any slot format for the target sub-band is one of M1 candidate slot formats, M1 being a positive integer greater than 1; among the M1 candidate slot formats there exists at least one candidate slot format in which an uplink time-domain symbol is earlier than a downlink time-domain symbol.

In one embodiment, the first Tx power is measured in dBm, and the first Tx power is linear with the target parameter value, and the number of resource block(s) comprised by the target time-frequency resource set in frequency domain is used to determine the target parameter value out of the C1 candidate parameter values.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node or the second node, or UE or terminal includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, test equipment or test instrument, and other radio communication equipment, etc. The base station in the present application includes but is not limited to macro-cellular base stations, micro-cellular base stations, home base stations, relay base station, eNB, gNB, Transmitter Receiver Point (TRP), relay satellite, satellite base station, airborne base station, test apparatus, test equipment or test instrument, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node with at least a processor and a memory for wireless communications, characterized in comprising:

a first receiver, which receives a first information block and receives a first signaling, the first information block comprising configuration information of a target sub-band, the configuration information of the target sub-band being used to at least determine a slot format for the target sub-band, and the first signaling being used to determine a target time-frequency resource set, the target time-frequency resource set comprising at least one resource block in frequency domain and at least one time-domain symbol in time domain; and a first transmitter, which transmits a target signal with a target transmit (Tx) power in the target time-frequency resource set;

wherein the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

2. The first node according to claim 1, characterized in that the first receiver receives a second information block; wherein the second information block is used to determine a first time-domain symbol set corresponding to downlink and a second time-domain symbol set corresponding to uplink; whether the target time-frequency resource set comprises at least one time-domain symbol belonging to the first time-domain symbol set in time domain is used to determine the target parameter value out of the C1 candidate parameter values, or, whether any time-domain symbol comprised by the target time-frequency resource set in time domain belongs to the second time-domain symbol set is used to determine the target parameter value out of the C1 candidate parameter values.

3. The first node according to claim 1, characterized in that the first receiver receives a third information block; wherein the third information block is used to determine a reference power upper-bound value; a first boundary value is equal to an upper boundary value of the value range of the target power upper limit, and a second boundary value is equal to a lower boundary value of the value range of the target power upper limit; the second parameter value and the reference power upper-bound value are used together to determine the first boundary value; the second boundary value is equal to a smaller value between a difference of the reference power upper-bound value and the target parameter value and a difference of the second parameter value and a power backoff value, or the second boundary value is equal to a smaller value between a difference of the reference power upper-bound value and a first offset value and a difference of the second parameter value and the power backoff value; the target parameter value is used to determine the power backoff value, and a position of resource blocks comprised by the target time-frequency resource set in frequency domain in a band to which the target time-frequency resource set belongs is used to determine the first offset value.

4. The first node according to claim 1, characterized in that a first boundary frequency is equal to a lowest boundary frequency of the target sub-band, while a second boundary frequency is equal to a highest boundary frequency of the target sub-band; a first reference frequency is equal to a sum of the first boundary frequency and a target frequency gap length, while a second reference frequency is equal to a difference between the second boundary frequency and the target frequency gap length; a first frequency interval is a frequency interval ranging from the first boundary frequency to the first reference frequency, while a second frequency interval is a frequency interval ranging from the second reference frequency to the second boundary frequency; a locational relation between the target time-frequency resource set and the first frequency interval or the second frequency interval in frequency domain is used to determine the target parameter value out of the C1 candidate parameter values.

5. The first node according to claim 1, characterized in that the configuration information of the target sub-band comprises at least one of location information of the target sub-band in frequency domain or a link direction indicator of the target sub-band; the link direction indicator of the target sub-band is used to determine the slot format for the target sub-band.

6. The first node according to claim 1, characterized in that any slot format for the target sub-band is one of M1 candidate slot formats, M1 being a positive integer greater than 1; among the M1 candidate slot formats there exists at least one candidate slot format in which an uplink time-domain symbol is earlier than a downlink time-domain symbol.

7. The first node according to claim 1, characterized in that the first Tx power is measured in dBm, and the first Tx power is linear with the target parameter, and the number of resource block(s) comprised by the target time-frequency resource set in frequency domain is used to determine the target parameter value out of the C1 candidate parameter values.

8. A second node with at least a processor and a memory for wireless communications, characterized in comprising:

a second transmitter, which transmits a first information block and transmits a first signaling, the first information block comprising configuration information of a target sub-band, the configuration information of the target sub-band being used to at least configure a slot format for the target sub-band, and the first signaling being used to indicate a target time-frequency resource set, the target time-frequency resource set comprising at least one resource block in frequency domain and at least one time-domain symbol in time domain; and a second receiver, which receives a target signal in the target time-frequency resource set, with a target transmit (Tx) power being equal to a transmit (Tx) power of the target signal;

wherein the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

9. The second node according to claim 8, characterized in that the second transmitter transmits a second information block; wherein the second information block is used to determine a first time-domain symbol set corresponding to downlink and a second time-domain symbol set corresponding to uplink; whether the target time-frequency resource set comprises at least one time-domain symbol belonging to the first time-domain symbol set in time domain is used to determine the target parameter value out of the C1 candidate parameter values, or, whether any time-domain symbol comprised by the target time-frequency resource set in time domain belongs to the second time-domain symbol set is used to determine the target parameter value out of the C1 candidate parameter values.

10. The second node according to claim 8, characterized in that the second transmitter transmits a third information block; wherein the third information block is used to determine a reference power upper-bound value; a first boundary value is equal to an upper boundary value of the value range of the target power upper limit, and a second boundary value is equal to a lower boundary value of the value range of the target power upper limit; the second parameter value and the reference power upper-bound value are used together to determine the first boundary value; the second boundary value is equal to a smaller value between a difference of the reference power upper-bound value and the target parameter value and a difference of the second parameter value and a power backoff value, or the second boundary value is equal to a smaller value between a difference of the reference power upper-bound value and a first offset value and a difference of the second parameter value and the power backoff value; the target parameter value is used to determine the power backoff value, and a position of resource blocks comprised by the target time-frequency resource set in frequency domain in a band to which the target time-frequency resource set belongs is used to determine the first offset value.

11. The second node according to claim 8, characterized in that a first boundary frequency is equal to a lowest boundary frequency of the target sub-band, while a second boundary frequency is equal to a highest boundary frequency of the target sub-band; a first reference frequency is equal to a sum of the first boundary frequency and a target frequency gap length, while a second reference frequency is equal to a difference between the second boundary frequency and the target frequency gap length; a first frequency interval is a frequency interval ranging from the first boundary frequency to the first reference frequency, while a second frequency interval is a frequency interval ranging from the second reference frequency to the second boundary frequency; a locational relation between the target time-frequency resource set and the first frequency interval or the second frequency interval in frequency domain is used to determine the target parameter value out of the C1 candidate parameter values.

12. The second node according to claim 8, characterized in that the configuration information of the target sub-band comprises at least one of location information of the target sub-band in frequency domain or a link direction indicator of the target sub-band; the link direction indicator of the target sub-band is used to determine the slot format for the target sub-band.

13. The second node according to claim 8, characterized in that the first Tx power is measured in dBm, and the first Tx power is linear with the target parameter, and the number of resource block(s) comprised by the target time-frequency resource set in frequency domain is used to determine the target parameter value out of the C1 candidate parameter values.

14. A method in a first node for wireless communications, characterized in comprising:

receiving a first information block and receiving a first signaling, the first information block comprising configuration information of a target sub-band, the configuration information of the target sub-band being used to at least determine a slot format for the target sub-band, and the first signaling being used to determine a target time-frequency resource set, the target time-frequency resource set comprising at least one resource block in frequency domain and at least one time-domain symbol in time domain; and transmitting a target signal with a target transmit (Tx) power in the target time-frequency resource set;

wherein the target Tx power is equal to a smaller value between a first Tx power and a target power upper limit, and a number of resource blocks comprised by the target time-frequency resource set in frequency domain is used to determine a first parameter value, the first Tx power being linear with the first parameter value; a power class of a transmitter of the target signal is used to determine a second parameter value, the second parameter value being used to determine a value range of the target power upper limit; a target parameter value is used to determine at least one of the value range of the target power upper limit or the first Tx power, and the target parameter value is one of C1 candidate parameter values, C1 being a positive integer greater than 1; at least one of a relation between the target time-frequency resource set and the target sub-band or the configuration information of the target sub-band is used to determine the target parameter value out of the C1 candidate parameter values.

15. The method in the first node according to claim 14, characterized in comprising:

receiving a second information block;

wherein the second information block is used to determine a first time-domain symbol set corresponding to downlink and a second time-domain symbol set corresponding to uplink; whether the target time-frequency resource set comprises at least one time-domain symbol belonging to the first time-domain symbol set in time domain is used to determine the target parameter value out of the C1 candidate parameter values, or, whether any time-domain symbol comprised by the target time-frequency resource set in time domain belongs to the second time-domain symbol set is used to determine the target parameter value out of the C1 candidate parameter values.

16. The method in the first node according to claim 14, characterized in comprising:

receiving a third information block;

wherein the third information block is used to determine a reference power upper-bound value; a first boundary value is equal to an upper boundary value of the value range of the target power upper limit, and a second boundary value is equal to a lower boundary value of the value range of the target power upper limit; the second parameter value and the reference power upper-bound value are used together to determine the first boundary value; the second boundary value is equal to a smaller value between a difference of the reference power upper-bound value and the target parameter value and a difference of the second parameter value and a power backoff value, or the second boundary value is equal to a smaller value between a difference of the reference power upper-bound value and a first offset value and a difference of the second parameter value and the power backoff value; the target parameter value is used to determine the power backoff value, and a position of resource blocks comprised by the target time-frequency resource set in frequency domain in a band to which the target time-frequency resource set belongs is used to determine the first offset value.

17. The method in the first node according to claim 14, characterized in that a first boundary frequency is equal to a lowest boundary frequency of the target sub-band, while a second boundary frequency is equal to a highest boundary frequency of the target sub-band; a first reference frequency is equal to a sum of the first boundary frequency and a target frequency gap length, while a second reference frequency is equal to a difference between the second boundary frequency and the target frequency gap length; a first frequency interval is a frequency interval ranging from the first boundary frequency to the first reference frequency, while a second frequency interval is a frequency interval ranging from the second reference frequency to the second boundary frequency; a locational relation between the target time-frequency resource set and the first frequency interval or the second frequency interval in frequency domain is used to determine the target parameter value out of the C1 candidate parameter values.

18. The method in the first node according to claim 14, characterized in that the configuration information of the target sub-band comprises at least one of location information of the target sub-band in frequency domain or a link direction indicator of the target sub-band; the link direction indicator of the target sub-band is used to determine the slot format for the target sub-band.

19. The method in the first node according to claim 14, characterized in that any slot format for the target sub-band is one of M1 candidate slot formats, M1 being a positive integer greater than 1; among the M1 candidate slot formats there exists at least one candidate slot format in which an uplink time-domain symbol is earlier than a downlink time-domain symbol.

20. The method in the first node according to claim 14, characterized in that the first Tx power is measured in dBm, and the first Tx power is linear with the target parameter, and the number of resource block(s) comprised by the target time-frequency resource set in frequency domain is used to determine the target parameter value out of the C1 candidate parameter values.

* * * * *